US008421597B2

(12) United States Patent
Matsumoto et al.

(10) Patent No.: US 8,421,597 B2
(45) Date of Patent: Apr. 16, 2013

(54) REMOTE CONTROL APPARATUS AND PORTABLE COMMUNICATION TERMINAL

(75) Inventors: Fumiaki Matsumoto, Higashiosaka (JP); Michiaki Koizumi, Daito (JP)

(73) Assignee: Kyocera Corporation, Kyoto (JP)

(*) Notice: Subject to any disclaimer, the term of this patent is extended or adjusted under 35 U.S.C. 154(b) by 1154 days.

(21) Appl. No.: 11/580,307

(22) Filed: Oct. 13, 2006

(65) Prior Publication Data

US 2007/0279248 A1 Dec. 6, 2007

(30) Foreign Application Priority Data

Oct. 14, 2005 (JP) ................................ 2005-300835
Oct. 14, 2005 (JP) ................................ 2005-300836

(51) Int. Cl.
*H04Q 5/22* (2006.01)

(52) U.S. Cl.
USPC ........... 340/10.1; 340/3.1; 340/3.7; 340/7.39; 340/12.22; 340/12.23

(58) Field of Classification Search ............. 340/825.72, 340/13.24, 10.1, 3.1, 3.7, 7.39, 12.22, 12.23
See application file for complete search history.

(56) References Cited

U.S. PATENT DOCUMENTS

| | | | | |
|---|---|---|---|---|
| 4,825,209 | A * | 4/1989 | Sasaki et al. | 340/12.55 |
| 5,777,570 | A * | 7/1998 | Kokubu | 341/173 |
| 5,917,425 | A * | 6/1999 | Crimmins et al. | 340/825.49 |
| 6,174,073 | B1 * | 1/2001 | Regan et al. | 362/249.13 |
| 6,556,813 | B2 * | 4/2003 | Tsui | 455/92 |
| 6,563,430 | B1 * | 5/2003 | Kemink et al. | 340/825.49 |
| 6,636,157 | B1 * | 10/2003 | Sato | 340/12.5 |
| 6,642,843 | B2 * | 11/2003 | Satoh | 340/509 |
| 6,717,528 | B1 * | 4/2004 | Burleson et al. | 340/825.72 |
| 6,791,467 | B1 * | 9/2004 | Ben-Ze'ev | 340/12.25 |
| 6,933,936 | B1 * | 8/2005 | Hirai | 345/211 |
| 7,116,242 | B2 * | 10/2006 | Guthrie | 340/4.3 |
| 7,193,504 | B2 * | 3/2007 | Carrender et al. | 340/10.4 |
| 7,254,182 | B2 * | 8/2007 | Tsui | 375/295 |
| 7,607,091 | B2 * | 10/2009 | Song | 715/734 |
| 2001/0048373 | A1 * | 12/2001 | Sandelman | 340/825.52 |
| 2001/0056305 | A1 * | 12/2001 | Moriya et al. | 700/23 |
| 2003/0020645 | A1 * | 1/2003 | Akiyama | 341/176 |
| 2003/0034897 | A1 * | 2/2003 | Shamoon et al. | 340/825.72 |
| 2004/0070491 | A1 * | 4/2004 | Huang et al. | 340/10.5 |

FOREIGN PATENT DOCUMENTS

| | | |
|---|---|---|
| JP | 2003-78977 | 3/2003 |
| JP | 2005-244676 | 9/2005 |

* cited by examiner

*Primary Examiner* — George Bugg
*Assistant Examiner* — Naomi Small
(74) *Attorney, Agent, or Firm* — Duane Morris LLP

(57) ABSTRACT

A portable communication terminal having a remote control apparatus includes a CPU. The CPU detects electronic appliances around there by a wireless tag reader, displays characters respectively corresponding to the detected appliances on a monitor, transmits test signals to these appliances, and changes a manner of the character of the appliance except for the appliance which responds, that is, in an off-state. Furthermore, the CPU detects identification information of a base station which is able to communicate with the terminal, registers the identification information detected under a desired location condition in the register, and determines whether or not a match condition is satisfied between detected identification information and the identification information which has been registered. Then, if the determination result is affirmative, the electronic appliance around there is detected by the wireless tag reader, and an operation screen for remotely controlling the detected appliance on a monitor is displayed.

14 Claims, 18 Drawing Sheets

(A)

28

| PN | STRENGTH |
|---|---|
| 21 | 5 |
| 25 | 4 |
| 22 | 3 |
| 18 | 2 |

(B)

28

| PN | STRENGTH |
|---|---|
| 18 | 5 |
| 21 | 3 |
| 22 | 3 |
| 25 | 2 |

(A)

(B)

FIG. 7
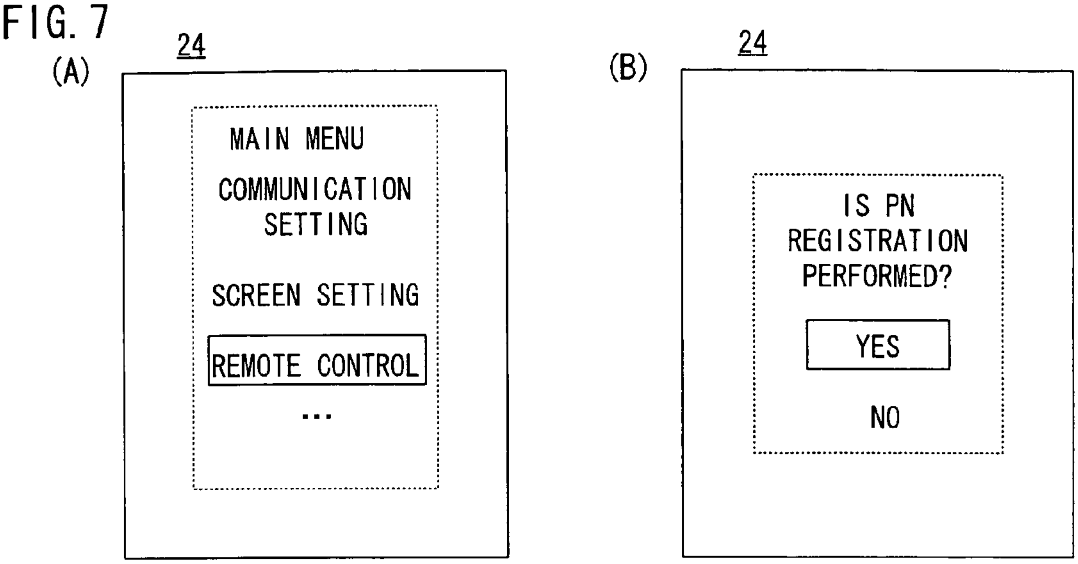
FIG. 8
28
| IDENTIFICATION INFORMATION | TRANSLUCENT FLAG |
|---|---|
| TELEVISION | OFF |
| AIR CONDITIONING | ON |
| LIGHTING | OFF |
FIG. 9
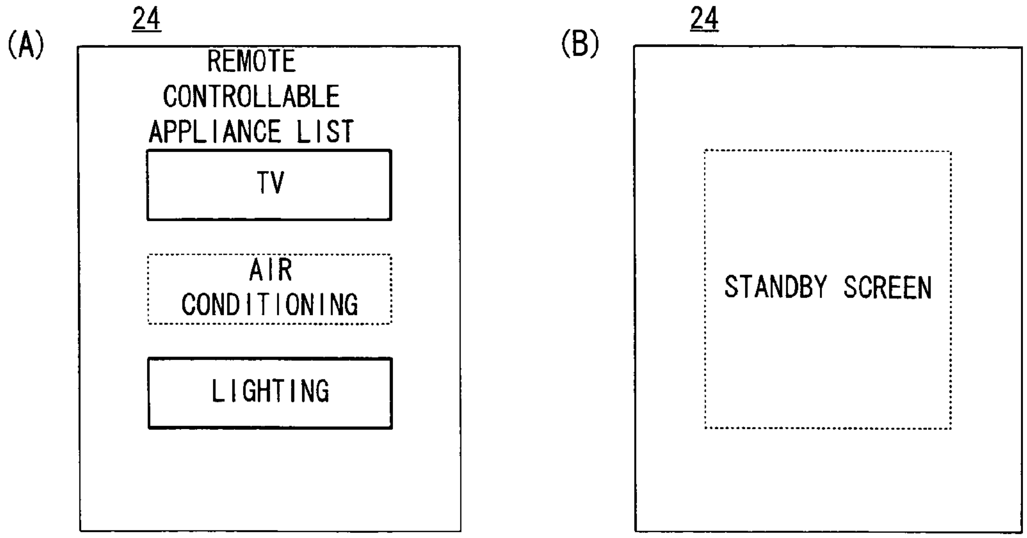

(A)

28

| ID | STRENGTH |
|---|---|
| 21 | 5 |
| 25 | 4 |
| 22 | 3 |
| 18 | 2 |

(B)

28

| ID | STRENGTH |
|---|---|
| 18 | 5 |
| 21 | 3 |
| 22 | 3 |
| 25 | 2 |

(A)

(B)

FIG. 22
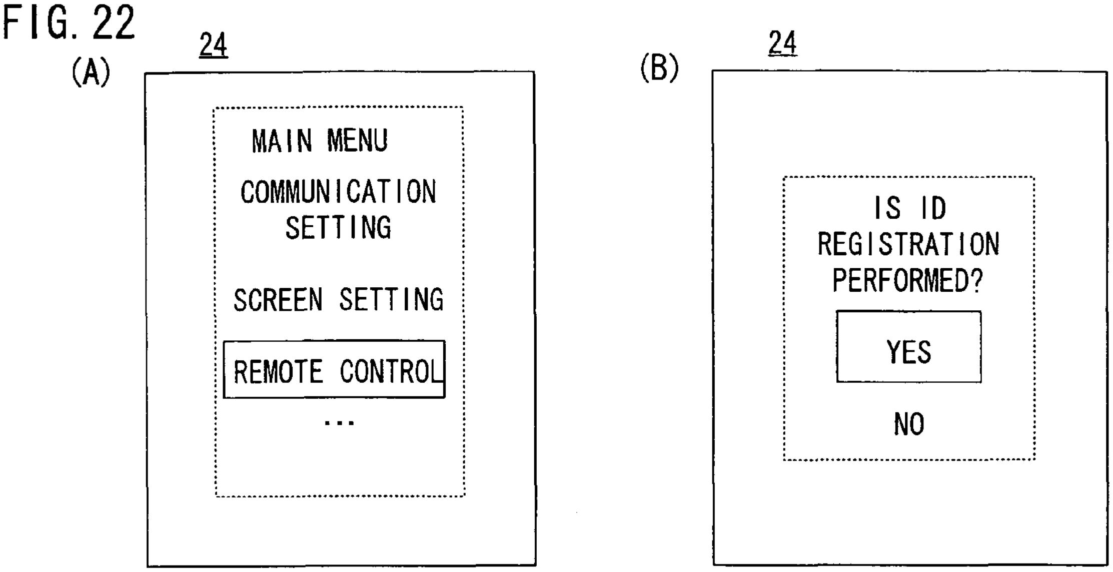
FIG. 23
28
| IDENTIFICATION INFORMATION | TRANSLUCENT FLAG |
|---|---|
| TELEVISION | OFF |
| AIR CONDITIONING | ON |
| LIGHTING | OFF |
FIG. 24
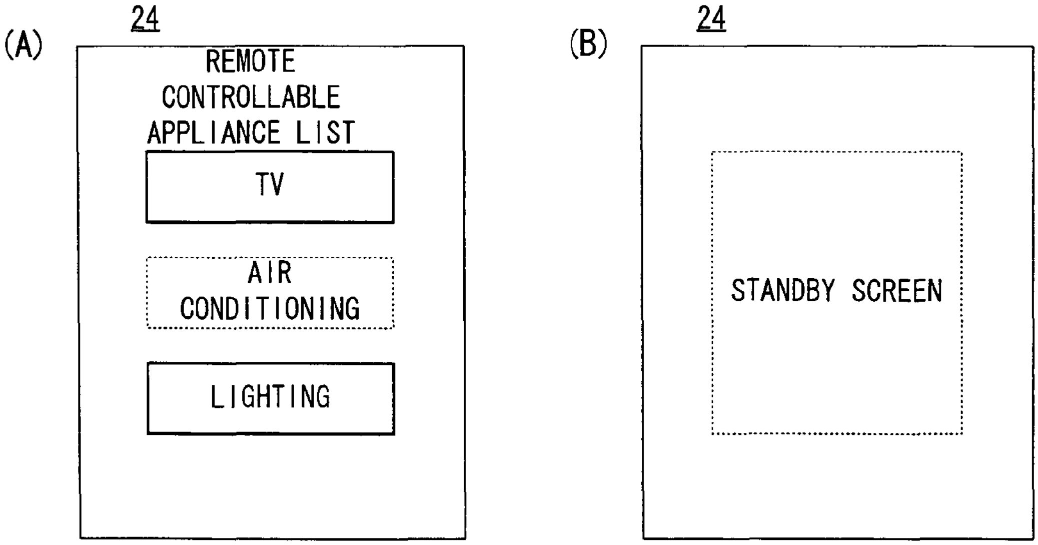

REMOTE CONTROL APPARATUS AND PORTABLE COMMUNICATION TERMINAL

CROSS REFERENCE OF RELATED APPLICATION

The disclosure of Japanese Patent Application No. 2005-300835 and Japanese Patent Application No. 2005-300836 are incorporated herein by reference.

BACKGROUND OF THE INVENTION

1. Field of the Invention

The present invention relates to remote control apparatuses and portable communication terminals. More specifically, the present invention relates to a remote control apparatus which remotely controls electronic appliances like a television, an air conditioning, etc., and a portable communication terminal endowed with such a remote control function.

2. Description of the Related Art

As an example of such a kind of conventional remote control apparatus, one disclosed in Japanese Patent Laying-open No. 2005-244676 (Patent Document 1) is known. The related art displays a plurality of bounding boxes (tab) respectively corresponding to a plurality of electronic appliances to be remotely controlled. In each of the plurality of tabs, letters indicative of a name of the electronic appliance corresponding to the tab are described. With reference to the plurality of tabs thus displayed, it is possible to select a desired appliance out of the plurality of electronic appliances.

However, most of the electronic appliances to be operated by remote control like a television, an air conditioning do not accept a remote control operation unless at least main power supply is turned on (in an on state or a standby state). Accordingly, all the plurality of electronic appliances to be remotely controlled is not always in a remote controllable state.

However, in the related art of Patent Document 1, the plurality of tabs are displayed irrespective of a state of individual electronic appliance, and therefore, a useless remote control operation to an appliance in an uncontrollable state may forcedly be done.

Furthermore as an example of such a kind of conventional portable communication terminal, one disclosed in Japanese Patent Laying-open No. 2003-78977 (Patent Document 2) is known. The related art has a plurality of buttons respectively corresponding to a plurality of electronic appliances, and stores a plurality of remote control codes respectively corresponding to the plurality of electronic appliances in a memory. When a button corresponding to a desired electronic appliance out of the plurality of buttons is pushed, a remote control code corresponding to the electronic appliance is read from the memory, and infrared rays corresponding to the read remote control code is sent. Thus, it is possible to remotely control the desired electronic appliance with the portable communication terminal.

However, in the related art of Patent Document 2, only the electronic appliance registered in advance can be remotely controlled while any of the registered appliances can remotely control electronic appliances with ease at even other's house.

SUMMARY OF THE INVENTION

Therefore, it is a primary object of the present invention to provide a novel remote control apparatus and a novel portable communication terminal.

Another object of the present invention is to provide a remote control apparatus capable of accurately remotely controlling electronic appliances around there.

The other object of the present invention is to provide a portable communication terminal which is able to remotely control electronic appliances existing under a desired location condition.

A remote control apparatus in accordance with a first invention comprises a first detector (S47) for detecting an electronic appliance (50, 80, 82, . . . ) having a wireless tag (66) by communicating with the wireless tag, a creator (S53) for creating a control signal adapting to the electronic appliance detected by the first detector, a first transmitter (S57) for repeatedly transmitting the control signal created by the creator to a processor of the electronic appliance detected by the first detector, a second detector (S59) for detecting an electronic appliance responding to the control signal transmitted by the first transmitter, and a display (S63) for displaying an operation screen to remotely control the electronic appliance detected by the second detector.

An electronic appliance having a wireless tag is detected by a first detector which communicates with the wireless tag. A control signal adapting the electronic appliance detected by the first detector is created by a creator. A first transmitter repeatedly sends the control signal created by the creator to a processor of the electronic appliance detected by the first detector. An electronic appliance responding to the control signal transmitted by the first transmitter is detected by a second detector. A display displays an operation screen to remotely control the electronic appliance detected by the second detector.

If the electronic appliance is in an off state, a communication with the processor of the electronic appliance is impossible. On the contrary thereto, a communication with a wireless tag provided to the electronic appliance is possible when the electronic appliance is in an off state. Here, in the first invention, an electronic appliance is first detected by communicating with a wireless tag, and a control signal adapting to the detected electronic appliance is generated.

The created control signal is transmitted to the processor of the detected electronic appliance, which allows detection of the electronic appliance in an on state or a standby state. The operation screen to be displayed by the display is a screen to remotely control the electronic appliance in an on state or a standby state. By means of such an operation screen, it is possible to remotely control an electronic appliance existing around there with precision.

It is preferable that the operation screen includes a plurality of characters respectively corresponding to a plurality of electronic appliances detected by the first detector. The remote control apparatus further comprises a first changer (S61) for changing a display manner of the character corresponding to the appliance except for the appliance detected by the second detector out of the plurality of characters included in the operation screen.

The first changer changes a display manner of the character corresponding to the appliance except for the appliance detected by the second detector out of the plurality of characters included in the operation screen.

The display manner of the character corresponding to the electronic appliance which is in an off state out of the plurality of characters included in the operation screen is changed, which allows an operator to visually recognize which one is remotely controllable out of the electronic appliance existing around there.

More preferably, the remote control apparatus further comprises a second transmitter (S85), when accepting an operation directed to a desired character included in the operation screen, for transmitting a control signal according to the operation to an appliance corresponding to the desired character, a determiner (S69, S71) for determining the presence or absence of a response to the control signal transmitted by the second transmitter, and a second changer (S73) for changing a display manner of a character corresponding to the desired electronic appliance when it is determined to be no response.

When an operation performed on a desired character within the operation screen is accepted, a control signal in response to the operation is transmitted to an electronic appliance corresponding to the desired character by a second transmitter. The presence or absence of a response to the control signal transmitted by the second transmitter is determined by a determiner. When the determiner determines no response, a second changer changes a display manner of the character corresponding to the desired electronic appliance.

Every time that a control signal is transmitted to a desired electronic appliance in response to an operation performed on the operation screen, a presence or absence of a response to the control signal is determined, and when it is determined to be no response, a displaying state of the character corresponding to the desired electronic appliance is changed. Thus, when the electronic appliance shifts from a controllable state to a non controllable state, the operator can confirm it instantaneously.

It is preferable that the remote control apparatus further comprises a location detector (S1) for detecting location information indicative of its own present location, a register (S45) for registering the location information detected by the location detector under a desired location condition; and a determiner (S13) for determining whether or not a match condition is satisfied between the location information detected by the location detector after completion of the registering process by the register and the location information registered in the register, and the appliance detector executes detection processing when a determination result by the determiner is affirmative.

The location information indicative of the present location of the remote control apparatus is detected by a location detector. The location information detected by a location detector under the desired location condition is registered by a register. A determiner determines whether or not a match condition is satisfied between the location information detected by the location detector after completion of the registering process by the register and the location information registered in the register. If the determination result is affirmative, an electronic appliance existing around there is detected by an appliance detector. An operation screen for remotely controlling the electronic appliance detected by the appliance detector is displayed by a display.

That is, the operation screen for remotely controlling an electronic appliance in an on state or a standby state around the remote control apparatus is displayed when the identification information detected by the information detector and the identification information which has been registered in the register satisfy with each other. Since the register registers the identification information detected under the desired location condition, the operation screen is displayed when the remote control apparatus exists under the desired location condition. Thus, it is possible to remotely control the electronic appliance in an on state or a standby state existing under a desired location condition by means of the remote control apparatus.

It is more preferable that a remote control apparatus further comprises a communicator (14) for executing communication processing with a base station, and the location detector detects identification information of a base station (ST1, ST2, . . . ) which is able to be communicated by the communicator as the location information.

The identification information of a base station which is able to be communicated by a communicator is detected as location information.

In one embodiment, the base station repeatedly sends a PN (Pseudo Noise) signal, and the location detector notes the PN signal sent from the base station.

A plurality of PN signals which is respectively transmitted from a plurality of base stations have frequencies different from each other. By noting such a PN signal, it is possible to identify a base station which is able to be communicated.

In another embodiment, the base station repeatedly sends an identification signal including the identification information of the base station, and the location detector notes the identification signal sent from the base station. Typically, the base station is a wireless LAN (Local Area Network) access point. In this case, an identification signal is only necessary to be a signal including information capable of identifying a predetermined base station, such as an MAC (Media Access Control) address assigned to the wireless LAN access point, an IP (Internet Protocol) address, a SSID (Service Set Identifier), etc.

An appliance control program in accordance with the first invention causes a processor (26) of a remote control apparatus (10) to execute following steps of a first detecting step (S47) for detecting an electronic appliance (50, 80, 82, . . . ) having a wireless tag (66) by communicating with the wireless tag, a creating step (S53) for creating a control signal adapting to the electronic appliance detected by the first detecting step, a first transmitting step (S57) for repeatedly transmitting the control signal created by the creating step to a processor (60) of the electronic appliance detected by the first detecting step, a second detecting step (S59) for detecting an electronic appliance responding to the control signal transmitted by the first transmitting step, and a displaying step (S63) for displaying an operation screen to remotely control the electronic appliance detected by the second detecting step.

An appliance controlling method of a remote control apparatus (10) in accordance with the first invention comprises a first detecting step (S47) for detecting an electronic appliance (50, 80, 82, . . . ) having a wireless tag by communicating with the wireless tag (66), a creating step (S53) for creating a control signal adapting to the electronic appliance detected by the first detecting step, a first transmitting step (S57) for repeatedly transmitting the control signal created by the creating step to a processor (60) of the electronic appliance detected by the first detecting step, a second detecting step (S59) for detecting an electronic appliance responding to the control signal transmitted by the first transmitting step, and a displaying step (S63) for displaying an operation screen to remotely control the electronic appliance detected by the second detecting step.

A portable communication terminal in accordance with a second invention comprises a communicator (14) for executing communication processing with a base station (ST1, ST2, . . . ), an information detector for detecting identification information of a base station which is able to be communicated by the communicator, a register (S45) for registering the identification information detected by the information detector under a desired location condition, a determiner (S13) for determining whether or not a match condition is satisfied between the identification information detected by the information detector after completion of registering processing by the register and the identification information registered by the register, an appliance detector (S55-S61) for detecting an electronic appliance (50, 80, 82, . . . ) existing around there when a determination result by the determiner is affirmative, and a display (S63) for displaying an operation screen to remotely control the electronic appliance detected by the appliance detector.

The communication processing with a base station is performed by a communicator. The identification information of a base station which is able to be communicated by the communicator is detected by an information detector. The identification information detected by the information detector under a desired location condition is registered by a register. A determiner determines whether or not a match condition is satisfied between the identification information detected by the information detector after completion of registering processing by the register and the identification information registered by the register. If the determination result is affirmative, an electronic appliance existing around there is detected by an appliance detector. An operation screen for remotely controlling the electronic appliance detected by the appliance detector is displayed by a display.

That is, an operation screen for remotely controlling an electronic appliance existing around the portable communication terminal is displayed when a match condition is satisfied between the identification information detected by the information detector and the identification information which has already been registered. Since the register registers the identification information registered under a desired location condition, the operation screen can be displayed when the portable communication terminal exists under the desired location condition. Thus, it is possible to remotely control the electronic appliance existing under the desired location condition by a portable communication terminal.

In one embodiment, the base station repeatedly sends a PN (Pseudo Noise) signal, and the information detector notes the PN signal sent from the base station.

A plurality of PN signals which are respectively transmitted from a plurality of base stations have frequencies different from each other. By noting such a PN signal, it is possible to identify a base station which is able to be communicated.

In another embodiment, the base station repeatedly sends an identification signal including the identification information of the base station, and the location detector notes the identification signal sent from the base station. Typically, the base station is a wireless LAN (Local Area Network) access point. In this case, an identification signal is only necessary to be a signal including information capable of identifying a predetermined base station, such as an MAC address assigned to a wireless LAN access point, an IP address, a SSID, etc.

It is preferable that the electronic appliance has a wireless tag (66) storing appliance identification information, and the appliance detector includes a reader (32) for reading the appliance identification information stored in the wireless tag.

The electronic appliance includes a wireless tag for storing appliance identification information, and the appliance detector can detect an electronic appliance around there by reading appliance identification information stored in the wireless tag by a reader.

It is preferable that a portable communication terminal further comprises a creator (S53) for creating a control signal adapting to the electronic appliance detected by the appliance detector, a transmitter (S57) for transmitting the control signal created by the creator to a processor of the electronic appliance detected by the appliance detector, an responding appliance detector (S59) for detecting an electronic appliance responding to the control signal transmitted by the transmitter, and the display changes a display manner of the operation screen according to a detection result of the responding appliance detector.

A control signal adapting to the electronic appliance detected by the appliance detector is created by a creator. A transmitter transmits the control signal created by the creator to a processor of the electronic appliance detected by the appliance detector. An electronic appliance responding to the control signal transmitted by the transmitter is detected by a responding appliance detector. The display changes a display manner of the operation screen according to a detection result of the responding appliance detector.

The control signal adapting to the detected electronic appliance is created, and the created control signal is transmitted to a processor of the detected electronic appliance. This makes it possible to detect the electronic appliance in an on state or a standby state. The operation screen displayed by the display is a screen for remotely controlling an on state or a standby state of the electronic appliance. By such an operation screen, it is possible to remotely control an electronic appliance around there with precision.

It should be noted that if the electronic appliance is in an off state, a communication with the processor of the electronic appliance is impossible, but a communication with a wireless tag provided to the electronic appliance is possible even when the electronic appliance is in an off state. Here, an electronic appliance is first detected by a communication with a wireless tag, a control signal adapting to the detected electronic appliance is generated, and the generated control signal is transmitted to a processor of the detected electronic appliance. Thus, by detecting an electronic appliance in an off state, a control signal is transmitted to a processor of the electronic appliance even in an off state, and whereby, it is possible to remotely control the electronic appliance with precision when the electronic appliance changes from the off state to the on state.

It is preferable that the transmitter repeatedly sends the control signal.

By repeatedly transmitting a control signal, it is possible to correspond to a change of a state of the electronic appliance.

More preferably, the portable communication terminal further comprises an acquirer (S51) for acquiring appliance control information to remotely control an electronic appliance detected by the appliance detector by utilizing the communicator, and the creator creates the control signal on the basis of the appliance control information acquired by the acquirer.

The appliance control information to remotely control an electronic appliance detected by the appliance detector is acquired by an acquirer. A creator creates the control signal on the basis of the appliance control information acquired by the acquirer.

By acquiring the appliance control information by utilizing the communicator, it is possible to also remotely control an electronic appliance except for the appliance registered in advance.

An appliance control program of a portable communication terminal in accordance with the second invention causes a processor (26) of a portable communication terminal (10) having a communicator (14) for executing communication processing with a base station (ST1, ST2, . . . ) to execute an information detecting step (S1) for detecting identification information of a base station which is able to be communicated by the communicator, a registering step (S45) for registering the identification information detected by the information detecting step under a desired location condition, a determining step (S13) for determining whether or not a match condition is satisfied between the identification information detected by the information detecting step after completion of registering processing by the registering step and the identification information registered by the registering step, an appliance detecting step (S55-S61) for detecting an electronic appliance existing around there when a determination result by the determining step is affirmative, and a displaying step (S63) for displaying an operation screen to remotely control the electronic appliance detected by the appliance detecting step.

An appliance controlling method in accordance with the second invention is an appliance controlling method of a portable communication terminal (10) having a communicator (14) to perform communication processing with a base station (ST1, ST2, . . . ), comprises an information detecting step (S1) for detecting identification information of a base station which is able to be communicated by the communicator, a registering step (S45) for registering the identification information detected by the information detecting step under a desired location condition, a determining step (S13) for determining whether or not a match condition is satisfied between the identification information detected by the information detecting step after completion of registering processing by the registering step and the identification information registered by the registering step, an appliance detecting step (S55-S61) for detecting an electronic appliance existing around there when a determination result by the determining step is affirmative, and a displaying step (S63) for displaying an operation screen to remotely control the electronic appliance detected by the appliance detecting step.

According to the first invention, it is possible to accurately remotely control an electronic appliance around there.

According to the second invention, it is possible to accurately remotely control the electronic appliance under the desired location condition with the portable communication terminal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 (B) is an illustrative view showing another example of the PN information detected in FIG. 1 embodiment;

FIG. 6 (B) is an illustrative view showing electronic appliances at a friend's house within the area shown in FIG. 4;

FIG. 7 (A) is an illustrative view showing one example of a screen to be displayed by FIG. 1 embodiment;

FIG. 7 (B) is an illustrative view showing another example of a screen to be displayed by FIG. 1 embodiment;

FIG. 8 is an illustrative view showing one example of an appliance list held by FIG. 1 embodiment;

FIG. 9 (A) is an illustrative view showing the other example of a screen to be displayed by FIG. 1 embodiment;

FIG. 9 (B) is an illustrative view showing a further example of a screen to be displayed by FIG. 1 embodiment;

FIG. 20 (B) is an illustrative view showing another example of the PN information detected in FIG. 16 embodiment;

FIG. 21 (B) is an illustrative view showing electronic appliances at a friend's house within the area shown in FIG. 19;

FIG. 22 (A) is an illustrative view showing one example of a screen to be displayed by FIG. 16 embodiment;

FIG. 22 (B) is an illustrative view showing another example of a screen to be displayed by FIG. 16 embodiment;

FIG. 23 is an illustrative view showing one example of an appliance list held in FIG. 16 embodiment;

FIG. 24 (A) is an illustrative view showing the other example of a screen to be displayed by FIG. 16 embodiment;

FIG. 24 (B) is an illustrative view showing a further example of a screen to be displayed by FIG. 16 embodiment;

FIG. 25 is a flowchart showing another part of the CPU operation in FIG. 16 embodiment;

DETAILED DESCRIPTION OF THE PREFERRED EMBODIMENTS

Figure 1:
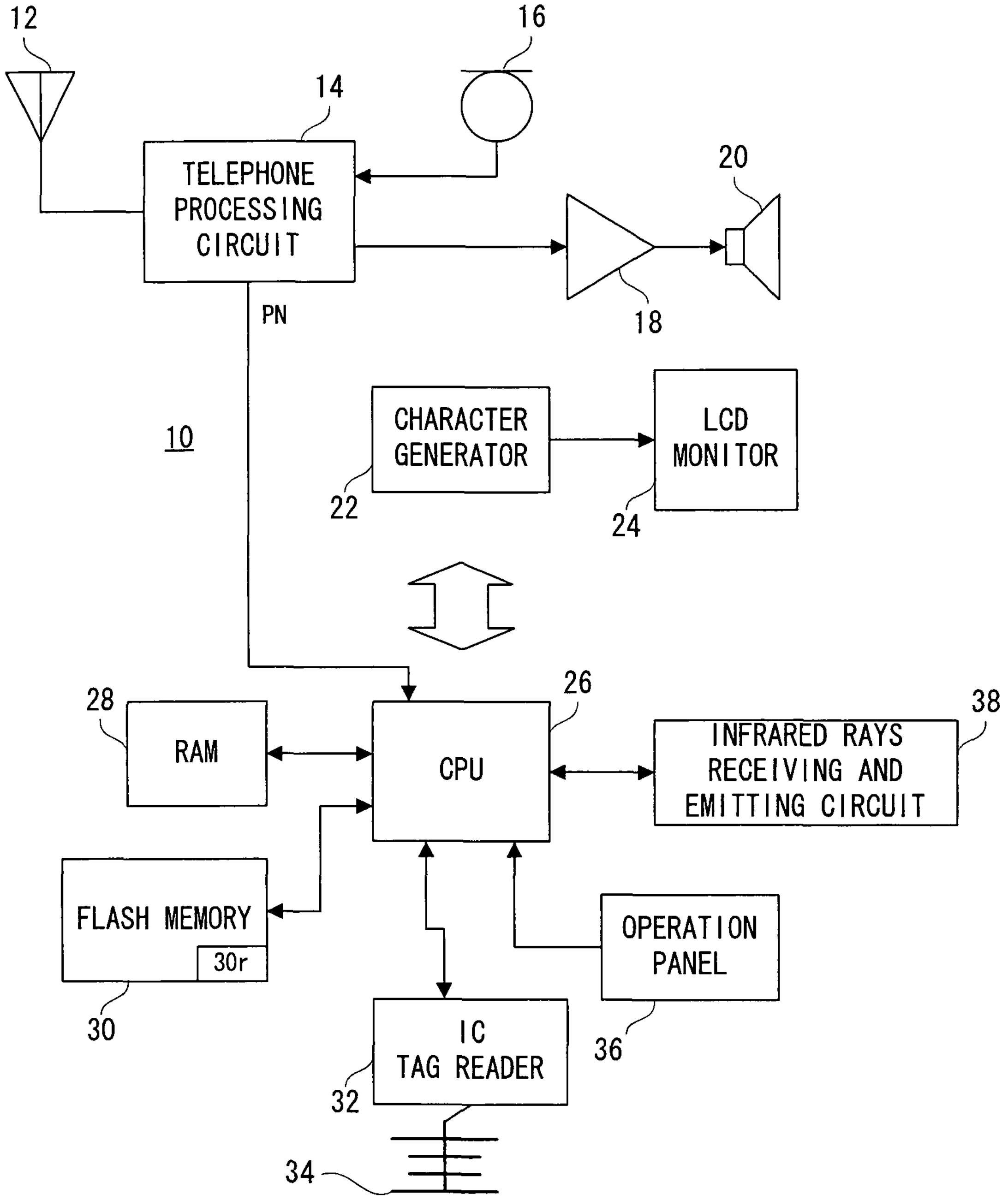
FIG. 1 is a block diagram showing a configuration of one embodiment of the present invention.

Referring to FIG. 1, a portable communication terminal 10 in accordance with the present embodiment includes a telephone processing circuit 14 which realizes a telephone call function in cooperation with a mobile communication system. Additionally, as long as a power source is turned on, the telephone call function is in an activated state. When a dialing operation is made by a calling operation panel 36, a CPU 26 instructs the telephone processing circuit 14 to perform a calling processing. The telephone processing circuit 14 executes a calling processing to thereby transmit a calling signal to a desired intended party. By the start of the calling processing, the portable communication terminal 10 shifts from a state in which a telephone communication is impossible to a state in which a telephone communication is tried.

On the other hand, if a calling signal is received through an antenna 12, the telephone processing circuit 14 generates a sound message for notifying an incoming call. By the start of such an incoming call notification processing, the portable communication terminal 10 shifts from the state in which a telephone communication is impossible to the state in which a telephone communication is tried. The generated sound message is output from a speaker 20 via an amplifier 18.

If an off-hook operation is not performed in response to the incoming call notification, a connection for telephone communication fails. The portable communication terminal 10 is returned from the state in which a telephone communication is tried to the state in which a telephone communication is impossible. On the other hand, if a hook operation is performed in response to the incoming call notification, a connection for telephone communication succeeds. The portable communication terminal 10 shifts from the state in which a telephone communication is tried to the state in which a telephone communication is possible.

When it changes to the state in which a telephone communication is possible, a sender sound picked up by a microphone 16 is subjected to modulation processing by the telephone processing circuit 14 to emit from the antenna 12. The emitted sender sound is transmitted to a communications terminal of an intended party. A receiver sound sent from the intended party is received by the antenna 12, and demodulated by the telephone processing circuit 14. The demodulated receiver sound is output from the speaker 20 through the amplifier 18. When one talker side performs an off-hook operation, the connection for telephone communication is shut down. The portable communication terminal 10 shifts from the state in which a telephone communication is possible to the state in which a telephone communication is impossible.

Furthermore, the telephone processing circuit 14 realizes a communication function for communicating with servers (not illustrated) on the Internet in cooperation with the mobile communication system.

However, the portable communication terminal 10 also functions as a remote controller for controlling electronic appliances by infrared rays at the place registered in advance like an own house. Whether or not a present location is the registered place is determined with reference to a PN (Pseudo Noise: pseudo noise) signal. For identifying the electronic appliances, an IC tag and an IC tag reader are utilized.

Here, the PN signal is a signal transmitted from a base station for a mobile communication system, and the value (frequency) is different from one base station from another. Furthermore, the strength of the detected PN signal is attenuated as the present location is away from the base station. Here, out of the detected PN signals, one having strength less than a threshold value is eliminated, and the values of the rest of the PN signals, that is, the values of the PN signals having strength equal to or more than the threshold value (hereinafter referred to as "PN value") is utilized for location determination.

First, with respect to the location determining function, the CPU 26 periodically executes PN detection processing for detecting a PN signal. When a PN registering operation is executed via the operation panel 36 at a certain place, the CPU 26 registers the PN value detected at that time in a register 30*r* formed in a flash memory 30. From that time onward, a PN value periodically detected and the PN value registered in the register 30*r* are compared with each other to thereby determine whether the present location matches with the registered location.

Figures 4, 5:
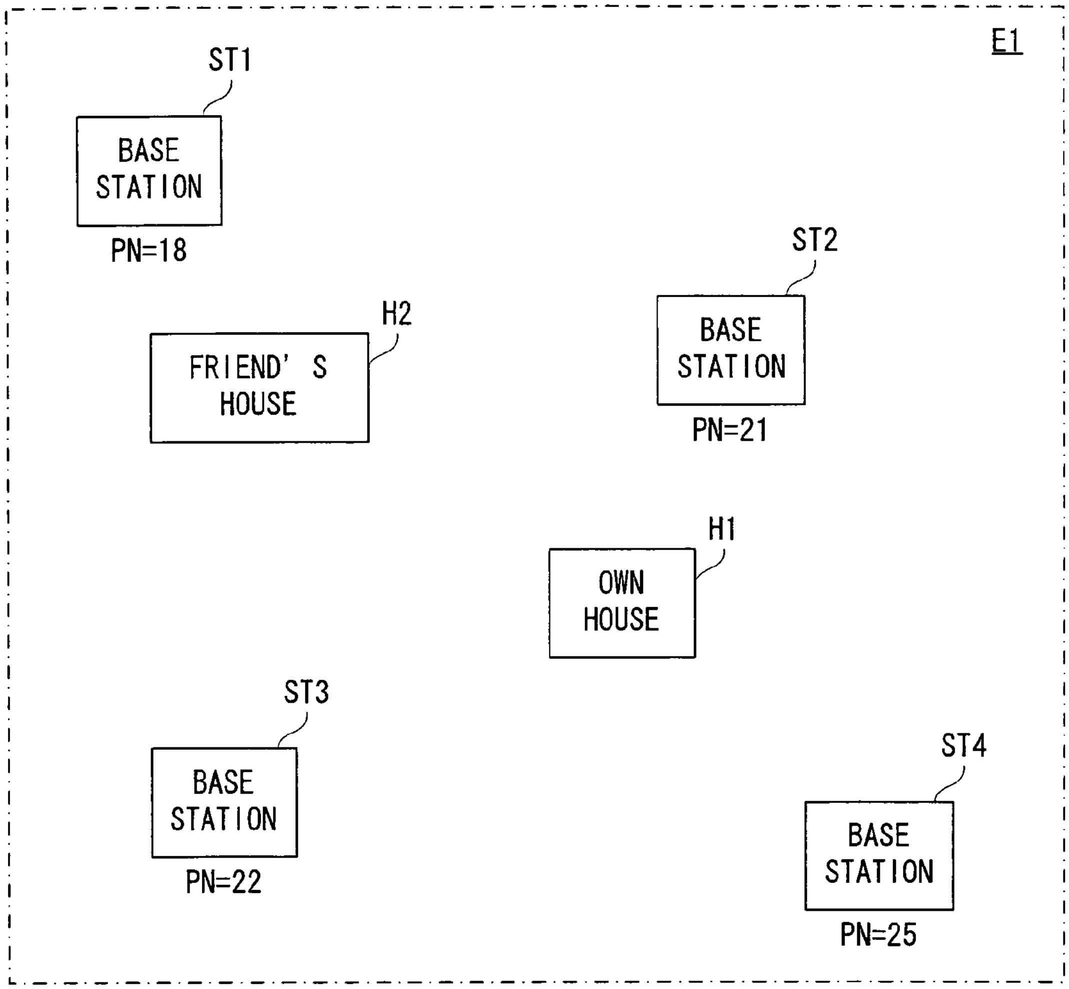
FIG. 4 is an illustrative view showing one example of an area in FIG. 1 embodiment.
FIG. 5 (A) is an illustrative view showing one example of PN information detected in FIG. 1 embodiment.

More specifically, with reference to FIG. 4, within an area E1 including an own house H1 and a friend's house H2, four base stations ST1-ST4 exist. The base stations ST1-ST4 are respectively assigned "18", "21", "22" and "25" as PN values. If the portable communication terminal 10 locates at the own house H1, the result of the PN detection is as shown in FIG. 5 (A), that is, respective values (PN) and intensities of four PN signals can be obtained. If the portable communication terminal 10 locates at the friend's house H2, the result of the PN detection is as shown in FIG. 5 (B).

It should be noted that the result of the PN detection is temporarily held in the RAM 28, and overwritten with a new detection result. As a result, the latest PN value is always held in the RAM 28.

Figure 3:
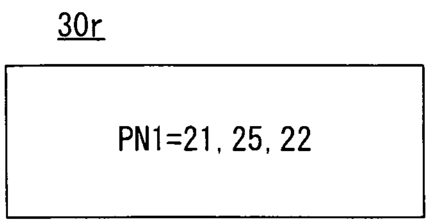
FIG. 3 is an illustrative view showing a PN value registered in FIG. 1 embodiment.

When a PN registering operation is performed at the own house H1, the CPU 26 abandons the PN having strength less than the threshold value (=3), that is, "18" out of the four PNs shown in FIG. 5 (A), and the rest of three PNs, that is, "21", "25" and "22" are registered in the register 30*r* as PN values "PN1" at the own house H1 (see FIG. 3).

From that time onward, the CPU 26 determines the latest PN value in the RAM 28 and the PN value in the register 30*r* match with each other every time a remote control mode is selected, and activates a remote control function when it is determined that they match with each other. The match here means that the combination of the PN values between the RAM 28 and the register 30*r* are completely equal, that is, any PN values in the RAM 28 exist in the register 30*r*, and any PN values in the register 30*r* exist in the RAM 28.

Accordingly, when the remote control mode is selected in the own house H1, the PN match (see FIG. 3 and FIG. 5 (A)) is determined to activate the remote control function. On the other hand, when the remote control mode is selected in the friend's house H2, "18" out of the "18", "21" and "22" in the RAM 28 does not exist in the register 30*r*, and therefore, a PN mismatch (see FIG. 3 and FIG. 5 (B)) is determined not to activate the remote control function.

Next, as to the remote control function, the portable communication terminal 10 further includes an infrared ray receiving and emitting circuit 38 for emitting and receiving infrared ray, and an IC tag reader 32 for reading identification information from an IC tag integrated in an electronic appliance. Meanwhile, an electronic appliance to be controlled have to be furnished with similar infrared ray receiving and emitting circuit and an IC tag storing identification information (manufacture name, model name, model number, etc.) of the appliance. The configuration of a television as one example of such an appliance is shown in FIG. 2.

Figure 2:
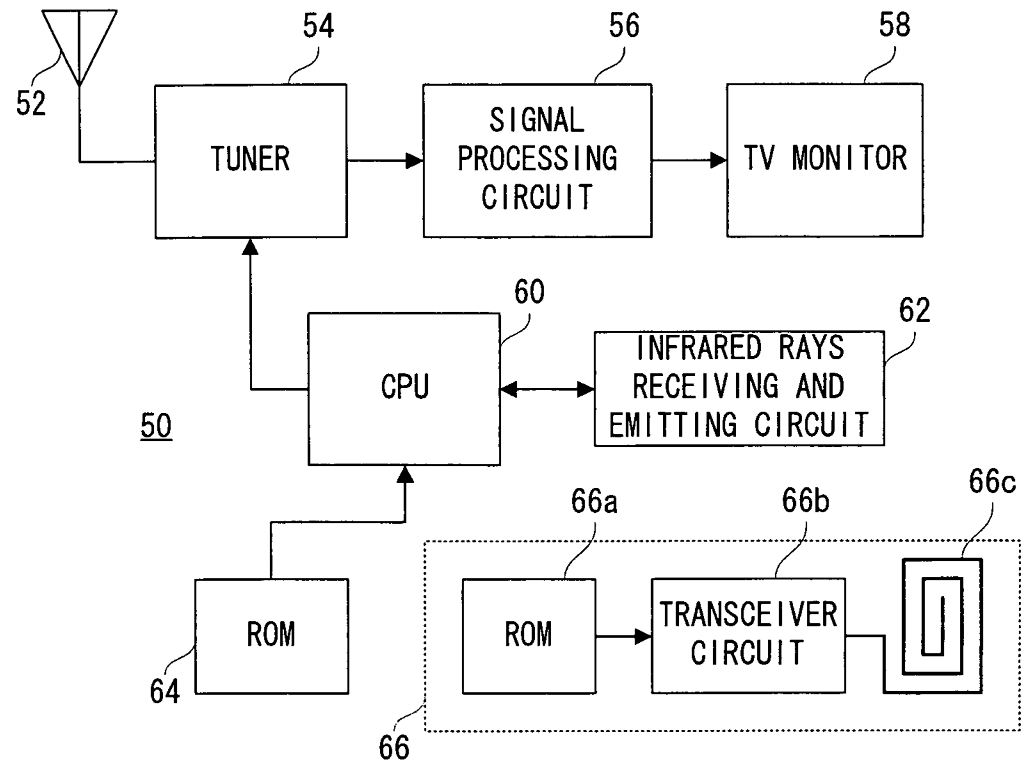
FIG. 2 is a block diagram showing a configuration of an appliance controlled by FIG. 1 embodiment.

Referring to FIG. 2, a television 50 is provided with an infrared ray receiving and emitting circuit 62 and an IC tag 66. The IC tag 66 includes a ROM 66*a*. The ROM 66*a* stores identification information of the television 50. When receiving a request signal from the IC tag reader 32 via an antenna 66*c*, a transceiver circuit 66*b* transmits the identification information stored in the ROM 66*a* from the antenna 66*c* to the IC tag reader 32. The transmitted identification information is received by the IC tag reader 32 through the antenna 34. Additionally, the remote control function is suspended when a main power supply of the television 50 is in an off state, but the IC tag 66 works when the main power supply of the television 50 is in the off state.

The IC tag reader 32 thus reads the identification information from the IC tag 66, and whereby, the CPU 26 of the portable communication terminal 10 can sends a remote control signal (infrared code) complying with the television 50. The infrared ray receiving and emitting circuit 62 applies the infrared code transmitted from the portable communication terminal 10 to the CPU 60. The CPU 60 sends a response signal back through the infrared ray receiving and emitting circuit 62, and applies a command corresponding to the applied infrared code to a tuner 54.

The response signal sent back from the infrared ray receiving and emitting circuit 62 is received by the infrared ray receiving and emitting circuit 38, and applied to the CPU 26. If a response signal is not received directly after the infrared code is transmitted (within one second, for example), the CPU 26 of the portable communication terminal 10 excludes the television 50 from an object to be controlled.

The tuner 54 selects a channel instructed by the CPU 60, and applies a broadcast signal of the selected channel in the signal processing circuit 56. The signal processing circuit 56 converts the applied broadcast signal into a program video signal and a program sound signal, and adjusts the level of the program sound signal according to the instruction from the CPU 26. The program video signal and the program sound signal are output to the TV monitor 58.

Figure 6:
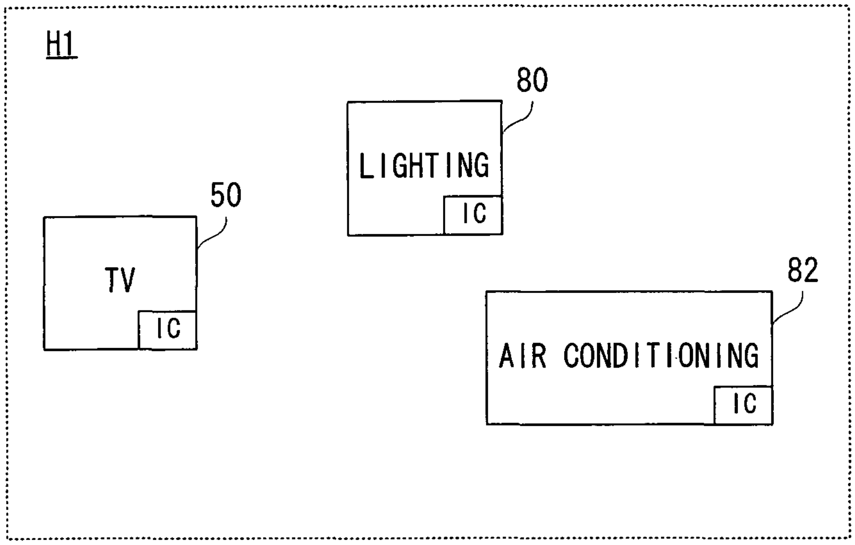
FIG. 6 (A) is an illustrative view showing electronic appliances existing at an own house within the area shown in FIG. 4.
Figure 6:
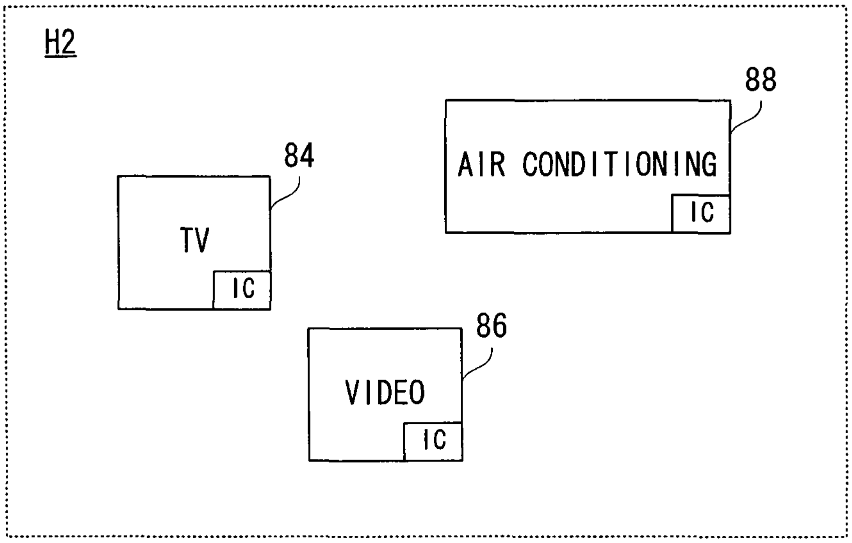

A description is made on how to remotely control the television 50 by operating the portable communication terminal 10 at the own house H1. With reference to FIG. 6, a lighting 80 and an air conditioning 82 are set in addition to the television 50 at the own house H1. Each of the lighting 80 and the air conditioning 82 has an IC tag, and may also be an object to be controlled by the portable communication terminal 10. It should be noted that the air conditioning 82 cannot send and receive an infrared code when the main power supply is in an off state.

Referring to FIG. 1 and FIG. 2, when an operation of calling a main menu screen is performed via the operation panel 36 of the portable communication terminal 10, a main menu screen shown in FIG. 7 (A) is displayed on the LCD monitor 24. When "remote control" is here selected on the operation panel 36, it is determined whether or not a PN registration has already been made. If the registration has not yet been made, a PN registration guiding screen is displayed on the LCD monitor 24 as shown in FIG. 7 (B).

When "YES" is selected on the PN registration guiding screen, appliance detecting processing is executed. In the appliance detecting processing, the IC tag reader 32 first transmits a request signal for requesting the IC tag 66 to transmit the identification information. If an appliance with the IC tag 66 exists within a reachable area of the request signal, the IC tag reader 32 can receive attribute information sent from the IC tag 66.

When the identification information is received by the IC tag reader 32, the CPU 26 registers the received identification information in the appliance list of the RAM 28 (see FIG. 8). Then, a remote control application corresponding to the registered identification information is activated. In FIG. 6 example, the television 50, the lighting 80 and the air conditioning 82 are detected, and remote control applications respectively corresponding to these three appliances are activated. It should be noted that if no corresponding remote control application is stored in the flash memory 30, a communication function is activated so as to execute processing for downloading a corresponding remote control application from the Internet.

Next, the CPU 26 sends test signals through the infrared ray receiving and emitting circuit 38. Each of the television 50 and lighting 80 receives the test signal, and sends a response signal back. The CPU 26 excludes the air conditioning 82 from the object to be controlled, and displays a remote controllable appliance list screen shown in FIG. 9 (A) on the LCD monitor 24. The screen shown in FIG. 9 (A) includes three tabs respectively corresponding to the television 50, the lighting 80, and the air conditioning 82. The "air conditioning" is not controllable out of them at this point, and translucently displayed.

When a channel selection operation and a volume adjustment operation are performed via the operation panel 36 in a state that "TV" is selected on the remote controllable appliance list screen, an infrared code according to the operation is transmitted by the television remote control application. The transmitted infrared code is received by the television 50, and the television 50 executes processing corresponding to the infrared code, that is, channel selection processing and volume adjustment processing.

After the PN registration is performed at the own house H1 as in the above-described manner, when a remote control mode is selected at the own house H1, the screen shown in FIG. 9 (A) is immediately displayed to allow execution of a desired remote control operation.

The operation of the portable communication terminal 10 at the friend's house H2 is what follows. Referring to FIG. 6 (B), a television 84, a video 86 and an air conditioning 88 are set in the friend's house H2. Any appliances have IC tags 66, and can be objects to be controlled by the portable communication terminal 10.

When a remote control mode is selected at the friend's house H2, a PN registration has not yet been performed at the friend's house H2, a PN registration guiding screen shown in FIG. 7 (B) is first displayed. If "NO" is selected here, the screen shown in FIG. 7 (B) is updated with a standby screen shown in FIG. 9 (B). That is, unless a PN registration is not made at the friend's house H2, it is impossible to utilize a remote control function at the friend's house H2. This makes it possible to activate the remote control function in the place except for the own house.

Additionally, if the remote control function is desired to be used even in the friend's house H2, this can be made by performing the PN registration at friend's house H2 with the friend's approval. That is, if "YES" is selected on the screen shown in FIG. 7(B), "18", "21" and "22" are further registered in the register 30*r* as PN values "PN2" at the friend's house H2. Next, the appliance detecting processing is executed to activate a remote control application corresponding to the detected appliance, and a remote controllable appliance list screen similar to FIG. 9 (A) is displayed. The screen includes three tabs respectively corresponding to the television 84, the video 86 and the air conditioning 88, that is, "television", "video" and "air conditioning". Then, test signals are transmitted to determine whether or not a remote control is possible depending on the presence or absence of the response. The tab of the appliance which is determined to be uncontrollable is displayed translucently. A user can perform a remote control operation on the remote controllable appliance list screen to a desired appliance. If the PN registration is performed at the friend's house H2, by merely selecting the remote control mode at the friend's house H2, it is possible to immediately perform a remote control operation from that time onward.

Figure 10:
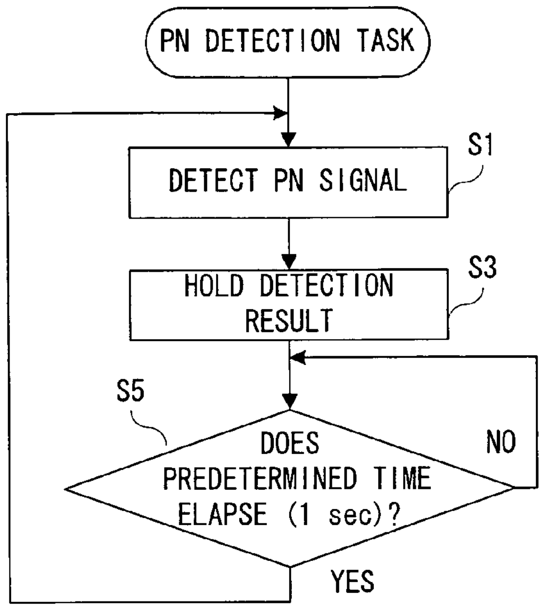
FIG. 10 is a flowchart showing a part of a CPU operation in FIG. 1 embodiment.
Figure 11:
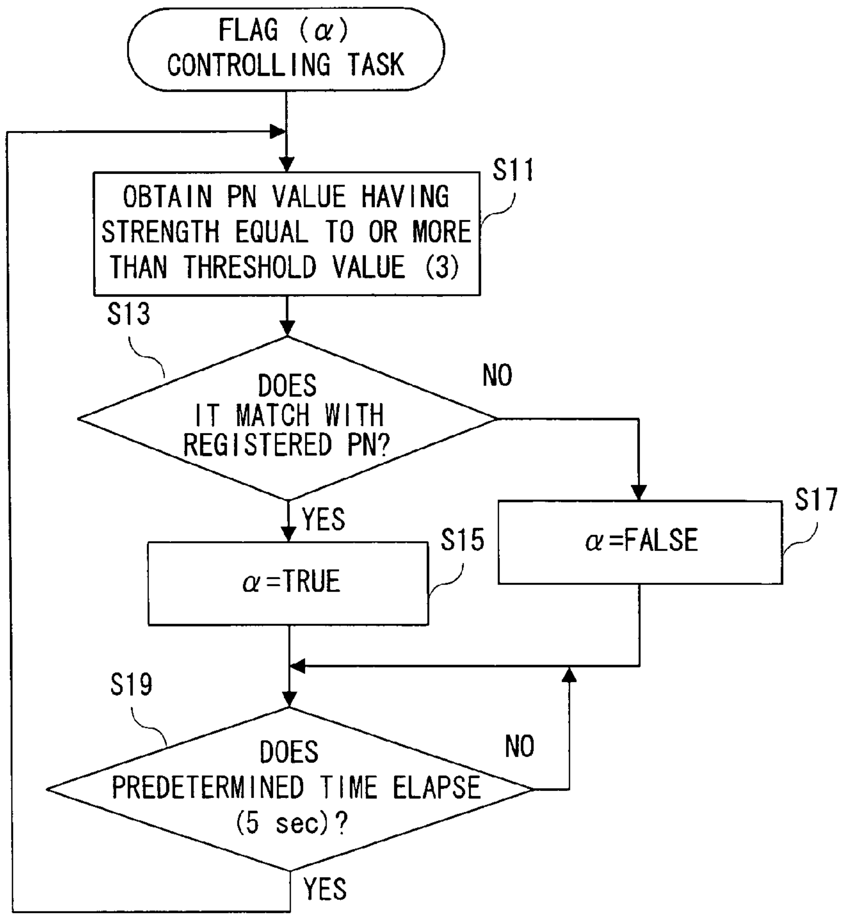
FIG. 11 is a flowchart showing another part of the CPU operation in FIG. 1 embodiment.
Figure 12:
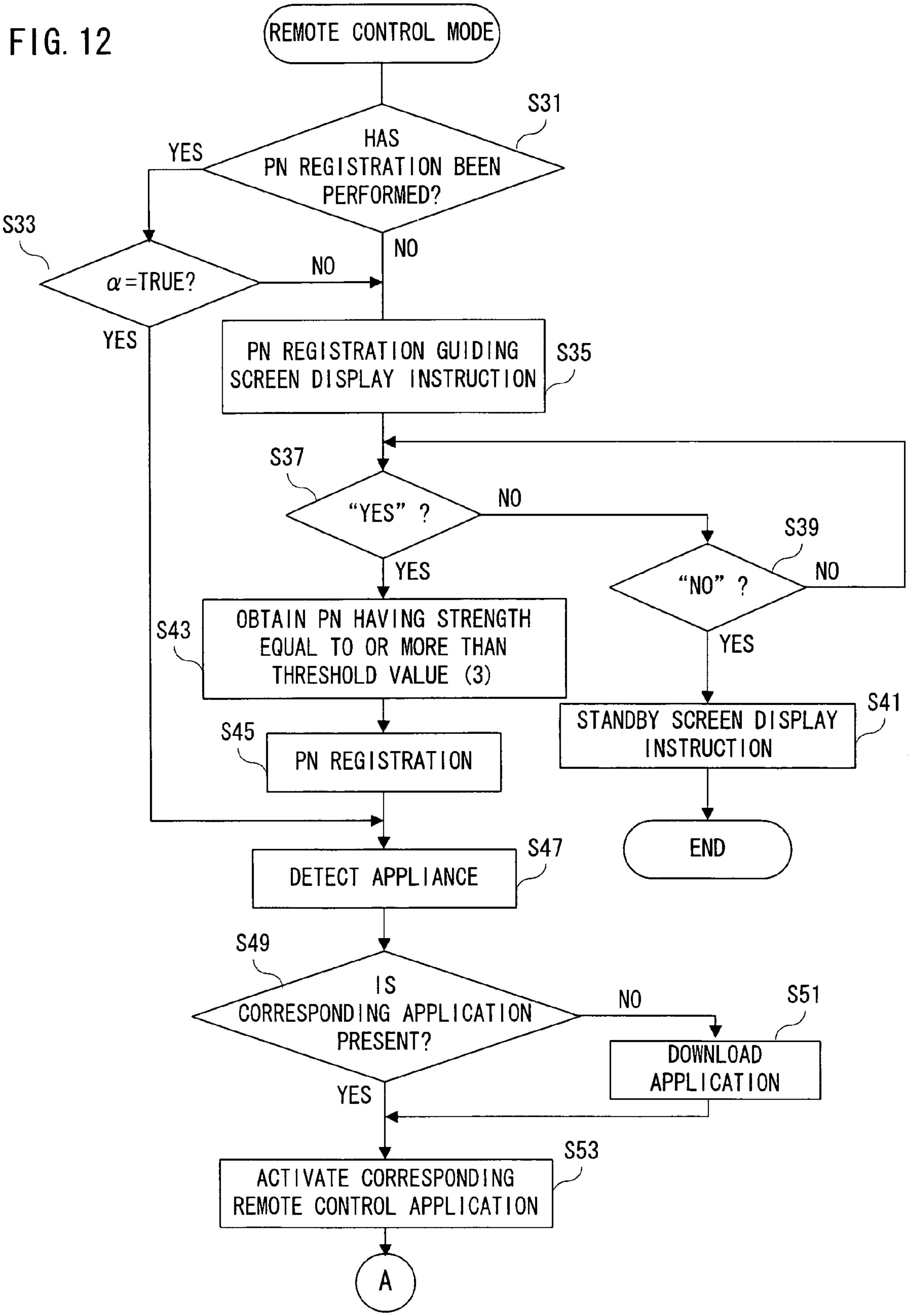
FIG. 12 is a flowchart showing the other part of the CPU operation in FIG. 1 embodiment.
Figure 13:
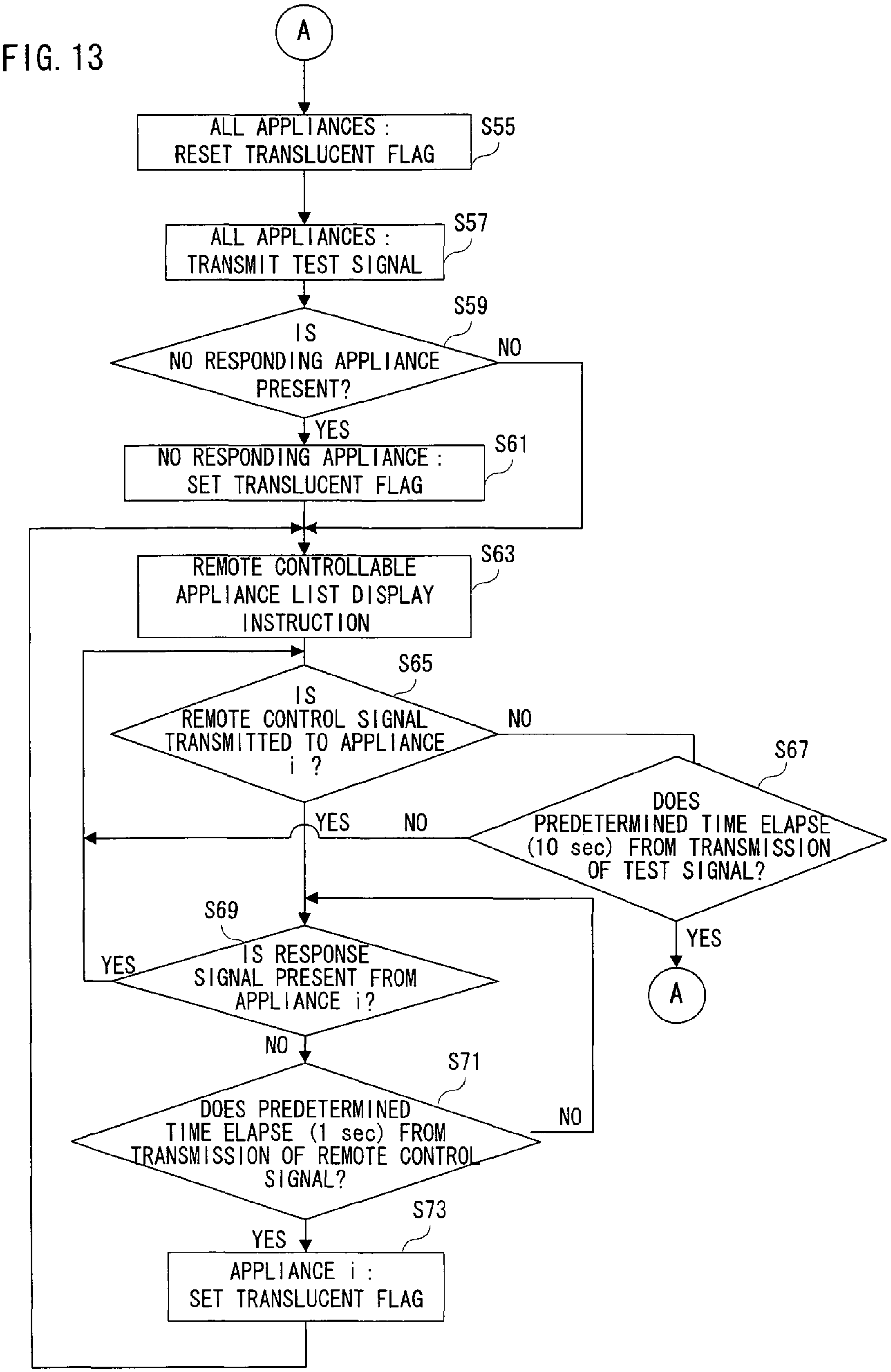
FIG. 13 is a flowchart showing a further part of the CPU operation in FIG. 1 embodiment.
Figure 14:
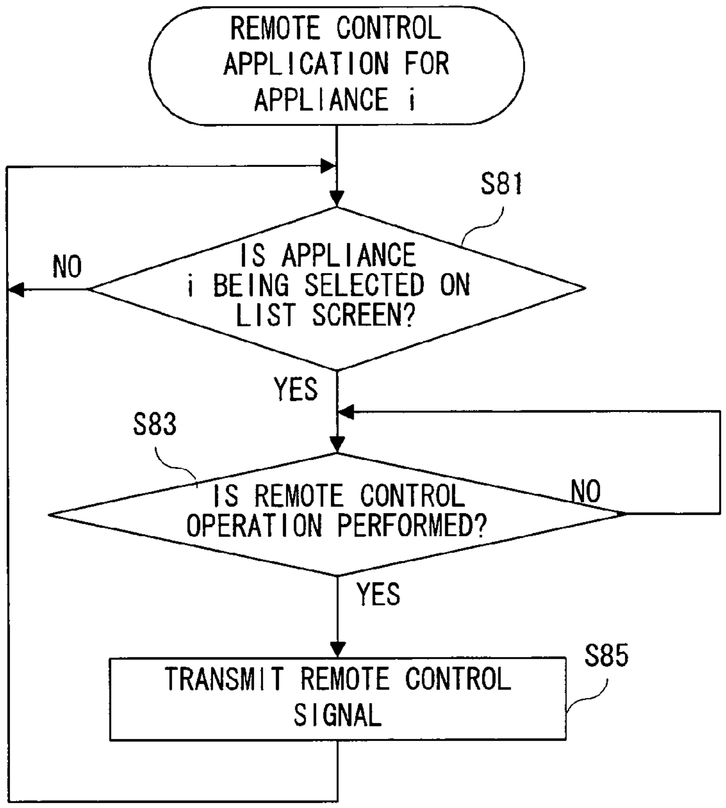
FIG. 14 is a flowchart showing another part of the CPU operation in FIG. 1 embodiment.

With respect to the above-mentioned remote control function, the CPU 26 of the portable communication terminal 10 executes a PN detecting task shown in FIG. 10, a flag (α) controlling task shown in FIG. 11, a main task (remote control mode) shown in FIG. 12 and FIG. 13, and a remote control application (television remote control application, lighting remote control application, etc.) shown in FIG. 14 under control of the multitasking OS like μITRON, etc. It should be noted that the remote control application is activated by the number the same as that of the detected electronic appliances. Meanwhile, the CPU of each electronic appliance, such as the CPU 60 of the television 50 executes a remote control processing task shown in FIG. 15.

It should be noted that the PN detecting task is in an activated state as long as the power source is turned on. The flag (α) controlling task and the main task are activated when the remote control mode is selected, and are ended when other modes are selected or when the power source is turned off. The remote control application is activated by the main task, and is ended when a mode except for the remote control mode is selected or when the power source is turned off.

Meanwhile, the remote control processing task of the electronic appliance is always in an activated state when the main power supply of the electronic appliance is in an on state.

Figure 15:
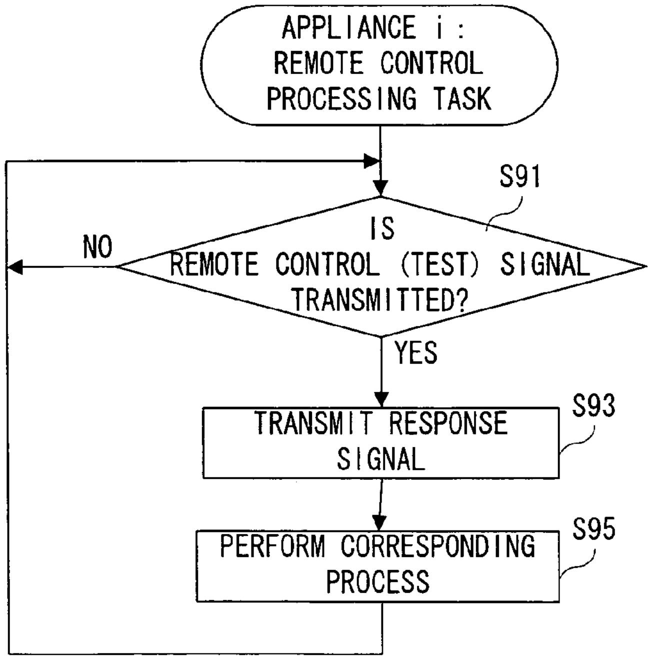
FIG. 15 is a flowchart showing a part of a CPU operation of the appliance shown in FIG. 2.

Furthermore, the control program according to the flowchart shown in FIG. 10-FIG. 13 is stored in the flash memory 30. The program according to the flowchart in FIG. 15 is stored in the ROM 64.

First, with reference to FIG. 10, in a step S1, a plurality of PN signals respectively transmitted from a plurality of base stations (ST1-ST4: see FIG. 4) through the telephone processing circuit 14 are detected. In a step S3, a detection result (PN information) is held in the RAM 28 (see FIG. 5 (A) and FIG. 5 (B)). In a step S5, it is determined whether or not a predetermined time (one second, for example) elapses from the preceding PN detection, and if "YES", the process returns to the step S1.

Referring to FIG. 11, in a step S11, a PN value having strength equal to or more than a threshold value (=3) is obtained from the RAM 28. For example, when the PN information shown in FIG. 5 (A) is held in the RAM 28, "21", "25" and "22" are obtained as PN values.

In a step S13, it is determined whether or not the obtained PN values match with the PN values registered in the register 30*r*. The match here means the combination of the PN values in the register 30*r* and the combination of the PN values obtained from the RAM 28 are completely equal to each other. Accordingly, if no PN value is registered in the register 30*r*, it is determined to be a mismatch. Furthermore, assuming that "PN1=21, 25 and 22" are registered in the register 30*r* (see FIG. 3), if the obtained PN value is "21", "25" and "22" (see FIG. 5 (A)), a match is determined. If the obtained PN value is "18", "21" and "22" (see FIG. 5 (B)), a mismatch is determined.

If "YES" is determined in the step S13, the process proceeds to a step S15, and "TRUE" is set to a flag α. If "NO" in the step S13, the process proceeds to a step S17 to set "FALSE" in the flag α. After setting, the process proceeds to a step S19. In the step S19, it is determined whether or not a predetermined time period (5 seconds, for example) elapses from the preceding PN obtaining, and if "YES" is determined, the process returns to the step S11.

With reference to FIG. 12, in a step S31, it is determined whether or not a PN value is registered in the register 30*r*, and if "NO", the process proceeds to a step S35. If "YES" in the step S31, it is determined whether or not the flag α is "TRUE" in a step S33, and if "YES" here, the process proceeds to a step S47. If α=FALSE, "NO" is determined in the step S33, and the process proceeds to the step S35.

In the step S35, the character generator 22 is instructed to display a PN registration guiding screen. In response thereto, the character generator 22 displays the PN registration guiding screen on the LCD monitor 24 (see FIG. 7 (B)). Then, in steps S37 and S39, it is determined whether or not the PN registration is performed. When "NO" is selected on the PN registration guiding screen according to an operation via the operation panel 36, the process proceeds to a step S41 instruct the character generator 22 to display a standby screen. In response thereto, the character generator 22 displays a standby screen on the LCD monitor 24 (see FIG. 9 (B)). Then, the task itself (remote control mode) is ended.

On the other hand, if "YES" is selected, a PN value having strength equal to or more than the threshold value (=3) is obtained from the RAM 28 in a step S43, and the obtained PN value is registered in the register 30*r* in a step S45 (see FIG. 3). Then, the process proceeds to a step S47.

In the step S47, appliance detecting processing is executed. In the appliance detecting processing, the IC tag reader 32 is instructed to transmit a request signal for requesting the IC tag 66 to send the identification information back. When the identification information is received by the IC tag reader 32, the received identification information is registered in the appliance list within the RAM 28 (see FIG. 8).

In a step S49, it is determined whether or not a remote control application corresponding to the detected appliance exists in the flash memory 30, and if "YES", the process proceeds to a step S53. If it is not a corresponding remote control application, application download processing is executed in a step S51. In the application download processing, a connection processing to the Internet is executed by cooperating the telephone processing circuit 14 and the network controller (not shown) to access a server offering the corresponding remote control application, and to download the corresponding remote control application from the server to the flash memory 30. After downloading, the process proceeds to the step S53.

In the step S53, the corresponding remote control application is activated. When the present location is at the own house H1 (see FIG. 6 (A)), and the television 50, the lighting 80 and the air conditioning 82 are detected, and a television remote control application, a lighting remote control application, and an air conditioning remote control application are activated. After activating, the process proceeds to a step S55.

Referring to FIG. 13, in the step S55, a translucent flag is reset. The reset is directed to all the appliances registered in the appliance list. In a step S57, test signals are transmitted through the infrared ray receiving and emitting circuit 38. The transmission is also directed to all the appliances. In a step S59, the presence or absence of the appliance which does not respond to the test signal is determined. If "NO" here, the process proceeds to a step S63. If "YES" in the step S59, that is, if there is an appliance which does not respond to the test signal, the process proceeds to a step S61 to set a translucent flag to the no-responsive appliance (see FIG. 8). Then, the process proceeds to the step S63.

In the step S63, the character generator 22 is instructed to display the remote controllable appliance list screen corresponding to the appliance list. In response thereto, the character generator 22 displays a remote controllable appliance list screen on the LCD monitor 24 (see FIG. 9 (A)). On the screen, a tab corresponding to the appliance to which the translucent flag is set is made translucent. Thus, if test signals are transmitted to all the appliances to thereby confirm an appliance which does not respond to the signal, the tab of the appliance is made translucent to thereby allow the user to immediately confirm that the appliance cannot be operated by remote control. Consequently, it is possible to decrease a useless remote control operation.

After completion of the display instruction, the process proceeds to a loop in the steps S65 and S67. During displaying the screen shown in FIG. 9 (A), by the remote control application of a desired appliance (appliance "i") out of the remote control applications activated in the step S53, acceptance of a remote control operation and transmission of a remote control signal are executed. In the step S65, it is determined whether or not a remote control signal (infrared code for the appliance i) to be directed to the appliance "i" is transmitted, and in the step S67, it is determined whether or not a predetermined time (ten seconds, for example) elapses from the transmission of the preceding test signal.

If transmission of the remote control signal is executed by the remote control application for the appliance "i" (see FIG. 14), "YES" is determined in the step S65, and the process proceeds to a loop in steps S69 and S71. In the step S69, the presence or absences of a response signal from the appliance "i" is determined, and in the step S71, it is determined whether or not a predetermined time (one second, for example) elapses from the transmission of the remote control signal. If "YES" in the step S69, the process returns to the loop in the steps S65 and S67.

If "YES" in the step S71, the process proceeds to a step S73 to set the translucent flag in the appliance "i". Then, the process returns to the step S63. Noted that in the current step S63, the translucent flag is set to the appliance "i", so that the tab of the appliance "i" within the remote controllable appliance list screen is translucently displayed.

Thus, the presence or absence of a response to a remote control signal is confirmed to each appliance, and if no response is transmitted from an appliance, the tab of the appliance is made translucent to thereby allow the user to immediately confirm that the remote control operation of the appliance is made impossible. Consequently, a useless remote control operation can be reduced.

Referring to FIG. 14, in a step S81, it is determined whether or not the appliance "i" is being selected on the remote controllable appliance list screen (see FIG. 9 (A)), and if it is selected, the presence or absence of a remote control operation is determined in a step S83. If a remote control operation is performed via the operation panel 36, "YES" is determined in the step S83, and the process proceeds to a step S85. In the step S85, a remote control signal corresponding to the performed remote control operation is transmitted through the infrared ray receiving and emitting circuit 38. Then, the process returns to the step S81.

Referring to FIG. 15, in the appliance "i" to be remotely controlled by the portable communication terminal 10, the CPU 60 determines the presence or absence of a remote control signal or a test signal. When a remote control signal or a test signal is received through the infrared ray receiving and emitting circuit 62, the process proceeds to a step S93 to send a response signal through the infrared ray receiving and emitting circuit 62 back. In a step S95, the processing corresponding to the received remote control signal is executed, and then, the process returns to a step S91.

As understood from the foregoing, in this embodiment, the CPU 26 receives four PN signals transmitted from four base stations ST1, ST2, ST3 and ST4 through the telephone processing circuit 14, and periodically detects a present location of the portable communication terminal 10 on the basis of the received four PN signals (S1, S3, S5).

When a registering operation is accepted via the operation panel 36, the detected location is registered in the register 30*r* (see FIG. 3) (S45). When a remote control starting operation is accepted via the operation panel 36 after registration, it is determined that whether or not the detected location and the registered location match with each other (S13), and detects an electronic appliance (50, 80, 82, . . . ) (S47) when the determination result is affirmative. A remote control signal is transmitted to any of the electronic appliances thus detected through the infrared ray receiving and emitting circuit 38.

Accordingly, only when the portable communication terminal 10 exists in the registered location, it can detect an electronic appliance, capable of properly restricting an object to be remotely controlled by the portable communication terminal 10.

Furthermore, the CPU 26 changes translucency of respective characters as shown in FIG. 9 (A) depending on the presence or absence of a response to test signals, that is, the possibility or impossibility of being remotely controlled by the portable communication terminal 10 (S59, S61, S63) when displaying a plurality of characters respectively corresponding to the detected plurality of electronic appliances on the LCD monitor 24. This makes it possible to know which one can be remotely controlled now out of the detected plurality of electronic appliances, that is, the plurality of appliances to be remotely controlled. Consequently, it is possible to select a desired appliance from the electronic appliances remotely controllable now.

The determination whether or not the appliance can be remotely controlled is performed on all the detected electronic appliances at a time and periodically by transmitting test signals, and, every time that a remote control signal is transmitted, is performed on an electronic appliance as a destination of the signal.

It should be noted that in this embodiment, a present location is detected by utilizing a plurality of PN signals respectively transmitted from a plurality of base stations. However, it is possible to perform position detection by utilizing other signals like a plurality of GPS signals respectively transmitted from a plurality of GPS (Global Positioning System) satellites.

Furthermore, whether or not the detected location and the registered location match with each other is determined whether or not the combinations of the PN values match between the RAM 28 and the register 30*r*, but it may be determined whether or not the order of PN values are completely match between the RAM 28 and the register 30*r*.

Another embodiment of the present invention is described below with reference to FIG. 16-FIG. 30. It should be noted that FIG. 16-FIG. 30 correspond to FIG. 1-FIG. 15. The embodiment is different from the afore-stated embodiment from the following points. The portable communication terminal 10 has a wireless LAN (Local Area Network) function, and the base station (ST1, ST2, . . . ) is a wireless LAN access point. The wireless LAN access point is assigned an MAC (Media Access Control) address, and the MAC address is repeatedly transmitted from the wireless LAN access point. Here, the portable communication terminal 10 uses an MAC address as identification information of a base station.

Figure 16:
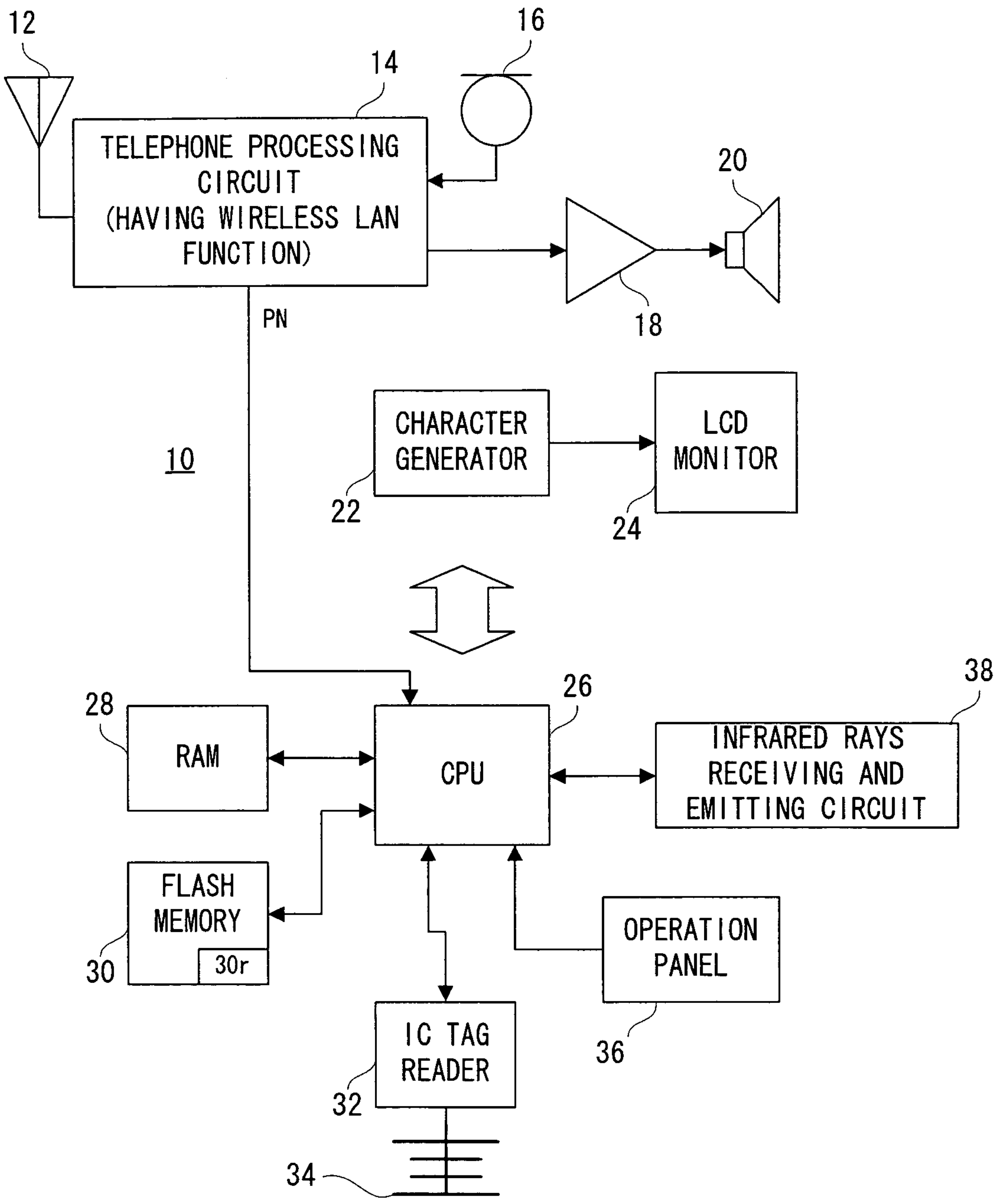
FIG. 16 is a block diagram showing a configuration of another embodiment of the present invention.
Figures 19, 20:
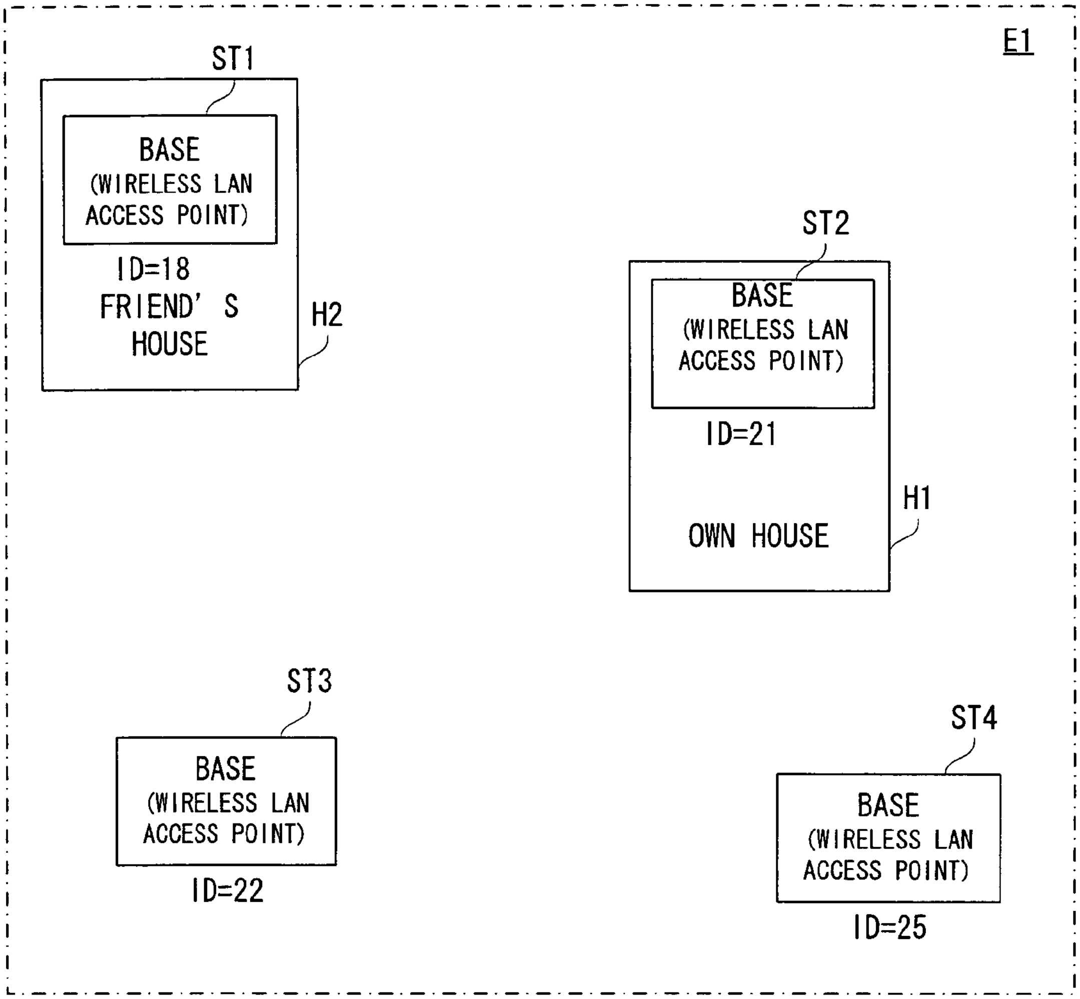
FIG. 19 is an illustrative view showing one example of an area shown in FIG. 16 embodiment.
FIG. 20 (A) is an illustrative view showing one example of PN information detected in FIG. 16 embodiment.
Figure 21:
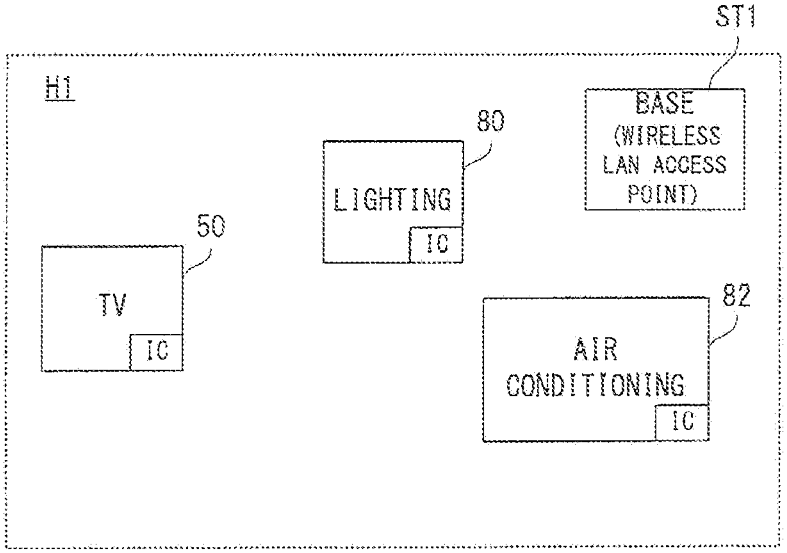
FIG. 21 (A) is an illustrative view showing electronic appliances at an own house within the area shown in FIG. 19.
Figure 21:
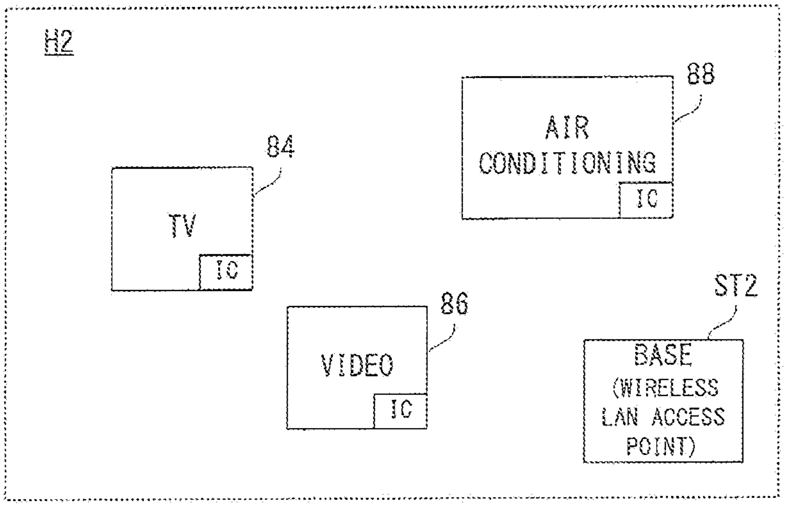

The embodiment is similar to the afore-stated embodiment except for these points, a duplicated description is omitted, and only the differences are described in detail. Referring to FIG. 16, a wireless LAN function is added to a telephone processing circuit 14. Meanwhile, as shown in FIG. 19, wireless LAN access points (base station ST1, ST2, . . . ) are further provided at the own house H1, the friend's house H2, etc.

The telephone processing circuit 14 connects a CPU 26 to the Internet through the wireless LAN access points, which realizes an IP (Internet Protocol) telephone. A CPU 60 determines whether or not a present location is the registered location with reference to MAC addresses repeatedly transmitted from the wireless LAN access points.

The strength of the signal including an MAC address (hereafter, called an "ID signal") is attenuated as the present location is away from a wireless LAN access point. Here, the signal having strength less than a threshold value out of the detected signals is excluded, and an MAC address (this may appropriately called "ID") included in the rest of the ID signal, that is, the ID signal having strength equal to or more than the threshold value is utilized for identification of the location.

First, as to the location determining function, the CPU 26 periodically executes ID detection processing for detecting an ID signal. When an ID registering operation is performed via an operation panel 36 at a certain place (see FIG. 22 (A) and FIG. 22 (B)), the CPU 26 registers the ID detected at that time in a register 30*r* formed in a flash memory 30. From that time onward, by comparing an ID periodically detected and the IDs which has been registered in the register 30*r*, it is possible to determine at any time whether or not the present location matches with the registered place.

More specifically, with reference to FIG. 19, at an area E1 including an own house H1 and a friend's house H2, four wireless LAN access points (base stations ST1-ST4) exist. The base stations ST1-ST4 are respectively assigned "18", "21", "22" and "25" as MAC addresses (ID). If the portable communication terminal 10 is placed at the own house H1, the result shown in FIG. 20 (A) can be obtained by of the ID detection. If the portable communication terminal 10 exists in the friend's house H2, the result of the ID detection is shown in FIG. 20 (B).

Figure 18:
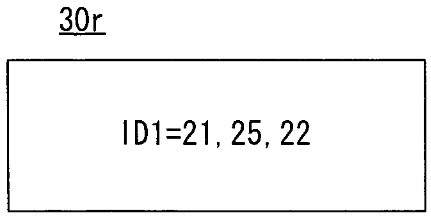
FIG. 18 is an illustrative view showing a PN value registered in FIG. 16 embodiment.

When an ID registering operation is performed at the own house H1, the CPU 26 abandons the ID having strength less than a threshold value (=3) out of four IDs shown in FIG. 20 (A), that is, "18", and registers the rest of three IDs, that is, "21", "25" and "22" as an ID "ID1" at the own house H1 in the register 30*r* (see FIG. 18).

From that time onward, the CPU 26 determines whether or not the latest ID in the RAM 28 and the IDs in the register 30*r* match with each other every time the remote control mode is selected, and activates a remote control function when it is determined to be a match.

Figure 17:
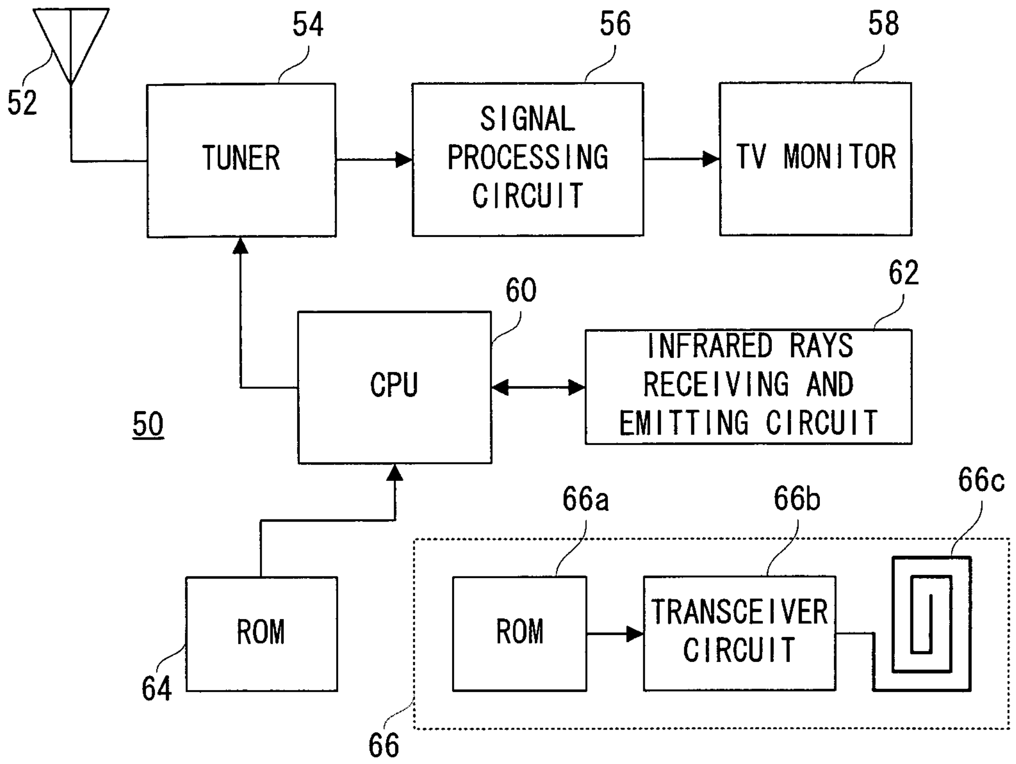
FIG. 17 is a block diagram showing a configuration of the appliance controlled by FIG. 16 embodiment.

Referring to FIG. 17, a television 50 is configured similar to that in FIG. 2, and performs a similar operation. The process for remotely controlling the television 50 by operating the portable communication terminal 10 at the own house H1 is similar to that in the afore-stated embodiment (see FIG. 21 (A), FIG. 21 (B), FIG. 22 (A), FIG. 22 (B), FIG. 23, FIG. 24 (A) and FIG. 24 (B)).

Figure 25:
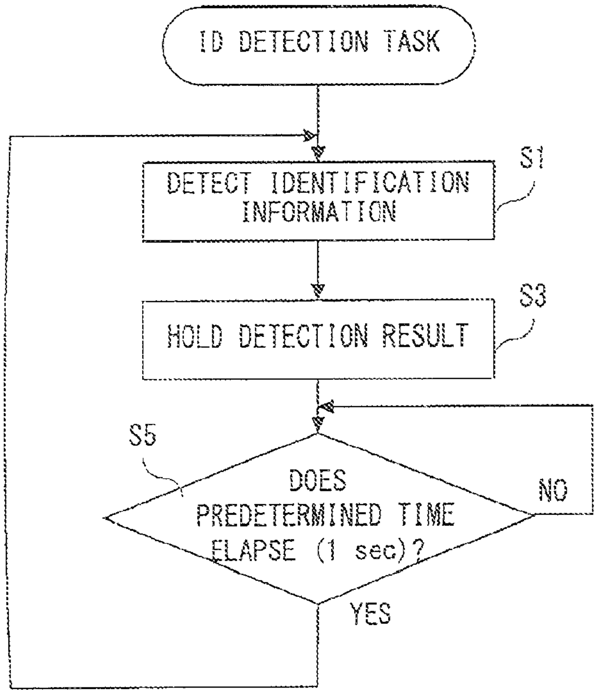
FIG. 25 is a flowchart showing a part of a CPU operation in FIG. 16 embodiment.
Figure 26:
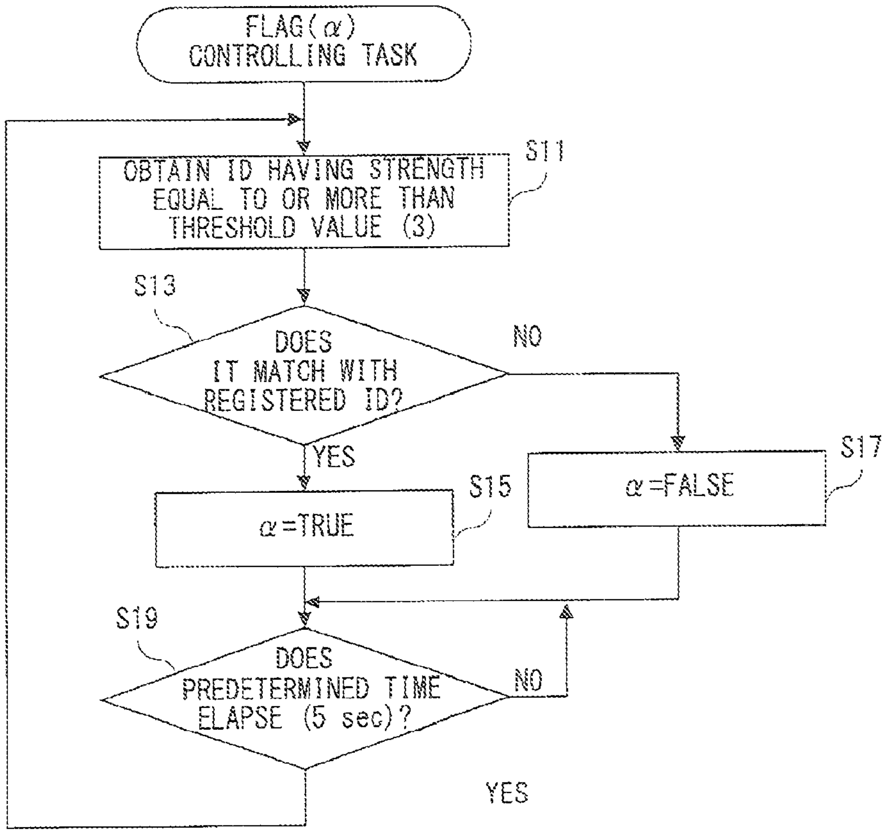
Figure 27:
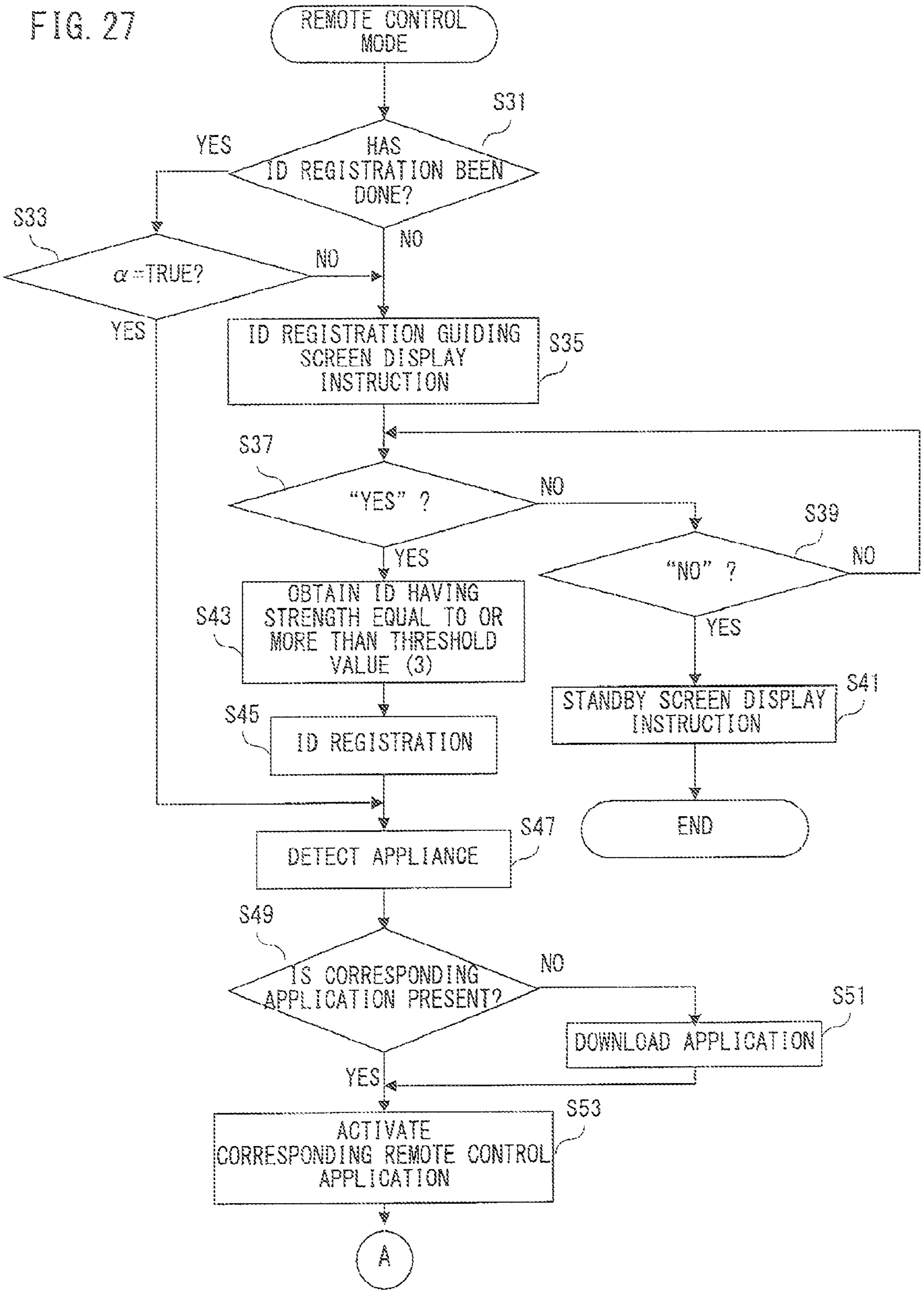
FIG. 27 is a flowchart showing the other part of the CPU operation in FIG. 16 embodiment.
Figure 28:
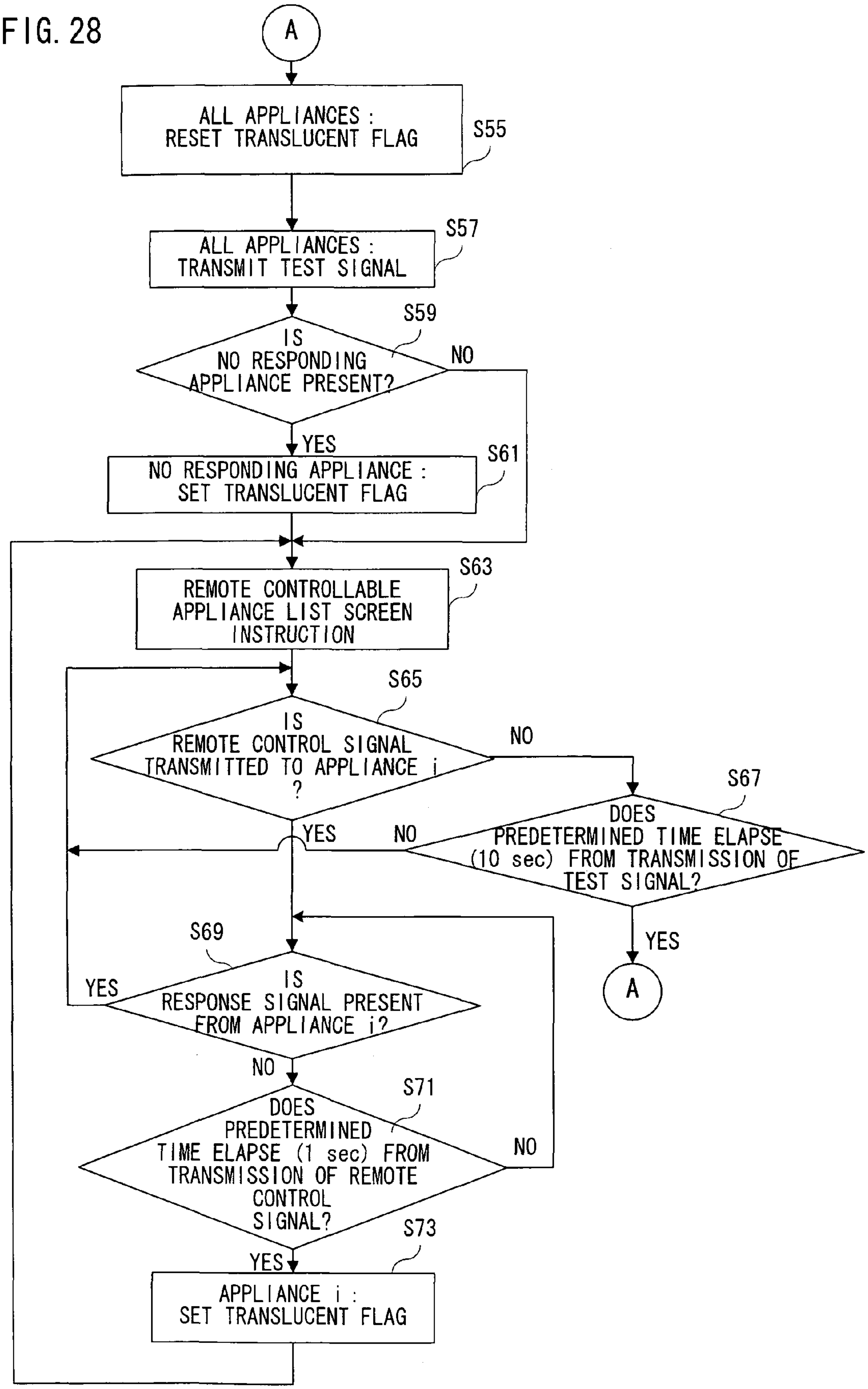
FIG. 28 is a flowchart showing a further part of the CPU operation in FIG. 16 embodiment.
Figure 29:
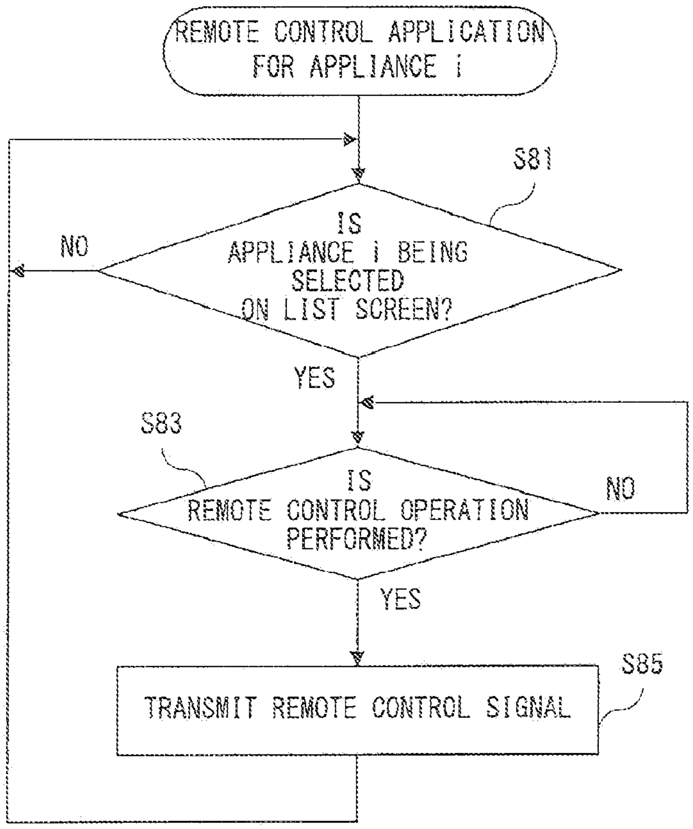
FIG. 29 is a flowchart showing another part of the CPU operation in FIG. 16 embodiment.

The CPU 26 of the portable communication terminal 10 executes in parallel an ID detection task shown in FIG. 25, a flag (α) controlling task shown in FIG. 26, a main task (remote control mode) shown in FIG. 27 and FIG. 28, and a remote control application shown in FIG. 29.

Referring to FIG. 25, in a step S1, a plurality of ID signals respectively transmitted from a plurality of wireless LAN access points (see ST1-ST4: FIG. 19) through the telephone processing circuit 14 are detected. The process onward is similar to that in the afore-mentioned embodiment (see FIG. 10).

Referring to FIG. 26, in a step S11, the ID having strength equal to or more than the threshold value (=3) is obtained from the RAM 28. In a step S13, it is determined whether or not the obtained ID matches with the ID which has been registered in the register 30*r*. The successive processing is similar to that in the afore-mentioned embodiment (see FIG. 11).

Referring to FIG. 27 and FIG. 28, in a step S31, it is determined whether or not an ID is registered in the register 30*r*, and if "NO", the process proceeds to a step S35. If "YES" in the step S31, it is determined whether or not the flag α is "TRUE" in a step S33, and if "YES" here, the process proceeds to a step S47. If α=FALSE, "NO" is determined in the step S33, and the process proceeds to the step S35.

In the step S35, a character generator 22 is instructed to display an ID registration guiding screen. In response thereto, the character generator 22 displays an ID registration guiding screen on the LCD monitor 24 (see FIG. 22 (B)). Then, in steps S37 and S39, it is determined whether or not an ID registration is performed. When "NO" is selected on the ID registration guiding screen through an operation of the operation panel 36, the process proceeds to a step S41 to instruct the character generator 22 to display a standby screen: In response thereto, the character generator 22 displays a standby screen on the LCD monitor 24 (see FIG. 24 (B)). Then, the task itself (remote control mode) is ended.

On the other hand, if "YES" is selected, the ID having strength equal to or more than the threshold value (=3) is obtained from the RAM 28 in a step S43, and the obtained ID is registered in the register 30*r* (see FIG. 18) in a step S45. The process onward is similar to that in the afore-mentioned embodiment (see FIG. 12 and FIG. 13).

The process in FIG. 29 is similar to that in the afore-stated embodiment (see FIG. 14).

Figure 30:
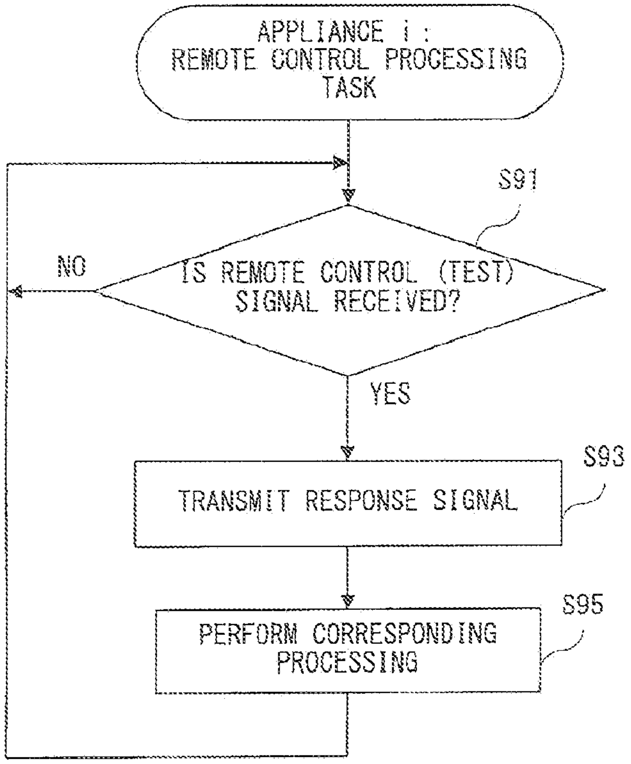
FIG. 30 is a flowchart showing a part of the CPU operation of the appliance in FIG. 17.

A CPU of each electronic appliance, like the CPU 60 of the television 50, for example, executes a remote control processing task shown in FIG. 30. The processing in FIG. 30 is similar to that in the afore-stated embodiment (see FIG. 15).

According to the present invention, similar to the afore-mentioned embodiment, the portable communication terminal 10 detects an electronic appliance only when it exists in the registered location, so that it is possible to appropriately control the object to be remotely controlled by the portable communication terminal 10.

Although provided that a wireless LAN is constructed at the house in this embodiment unlikely to the afore-stated embodiment, a narrow reachable range of an ID signal transmitted from the wireless LAN access point allows more accurate determination whether or not the present location is the registered location.

It should be noted that in this embodiment, an MAC address is used as identification information (ID) for identifying a wireless LAN access point (base station), other identification information such as a SSID (Service Set Identifier), etc. may be used. Or, an ESSID (Extended Service Set Identifier) including a plurality of wireless LAN access points for identifying a wireless LAN may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control apparatus for remotely controlling electronic equipment provided with a wireless tag which transmits an identification signal, comprising:

a receiver which receives the identification signal from the wireless tag provided on the electronic equipment;

a first detector which detects, based on the identification signal received by said receiver, an electronic appliance;

a creator which creates a control signal adapting to the electronic appliance detected by said first detector;

a first transmitter which repeatedly transmits a control signal created by said creator to a processor of said electronic appliance detected by said first detector;

a second detector which detects an electronic appliance responding to the control signal transmitted by said first transmitter; and a display which displays an operation screen to remotely control the electronic appliance detected by said second detector, wherein in said operation screen, a character corresponding to the electronic appliance in at least one of an on state or a standby state detected by said second detector is displayed, and a character corresponding to an electronic appliance in an off state, except for the electronic appliance detected by said second detector, out of one or more electronic appliances detected by said first detector is further displayed in a different manner from that of at least one of the characters corresponding to the electronic appliance, detected by said second detector.

2. A remote control apparatus according to claim 1, wherein said operation screen includes a plurality of characters respectively corresponding to a plurality of electronic appliances detected by said first detector, and further comprising a first changer which changes a display manner of the character corresponding to the appliance except for the appliance detected by said second detector out of said plurality of characters included in said operation screen.

3. A remote control apparatus according to claim 2, further comprising:

a second transmitter, when accepting an operation directed to a character included in the operation screen displayed by said display, which transmits a control signal according to the operation to an appliance corresponding to the desired character;

a determiner which determines the presence or absence of a response to the control signal transmitted by said second transmitter; and a second changer which changes a display manner of a character corresponding to said desired electronic appliance out of said plurality of characters included in said operation screen when it is determined to be no response.

4. A remote control apparatus according to claim 1, further comprising:

a location detector which detects location information indicative of its own present location;

a register which registers the location information detected by said location detector under a desired location condition; and a determiner which determines whether or not a match condition is satisfied between the location information detected by said location detector after completion of the registering process by said register and the location information registered in said register, wherein said first detector executes detection processing when a determination result by said determiner is affirmative.

5. A remote control apparatus according to claim 4, further comprising a communicator which executes communication processing with a base station, wherein said location detector detects identification information of a base station which is able to be communicated by said communicator as said location information.

6. A remote control apparatus according to claim 5, wherein said base station repeatedly sends a PN signal, and said location detector notes the PN signal sent from said base station.

7. A remote control apparatus according to claim 5, wherein said base station repeatedly sends an identification signal including the identification information of said base station, and said location detector notes the identification signal sent from said base station.

8. A remote control apparatus according to claim 5, wherein said base station is a wireless LAN access point, and said identification signal includes an MAC address assigned to said wireless LAN access point.

9. A recording medium recording art appliance control program, wherein said appliance control program causes a processor of a remote control apparatus to execute following steps of:

a first detecting step for detecting an electronic appliance having a wireless tag by communicating with said wireless tag;

a creating step for creating a control signal adapting to the electronic appliance detected by said first detecting step;

a first transmitting step for repeatedly transmitting a control signal created by said creating step to a processor of said electronic appliance detected by said first detecting step;

a second detecting step for detecting an electronic appliance responding to the control signal transmitted by said first transmitting step; and a displaying step for displaying an operation screen to remotely control the electronic appliance detected by said second detecting step, wherein in said operation screen, a character corresponding to the electronic appliance in at least one of an on state or a standby state detected by said second detecting step is displayed, and a character corresponding to an electronic appliance in an off state, except for the electronic appliance detected by said second detecting step, out of one or more electronic appliances detected by said first detecting step is further displayed in a different manner from that of at least one of the characters corresponding to the electronic appliance detected by said second detecting step.

10. A controlling method of a remote control apparatus, comprising:

a first detecting step for detecting an electronic appliance having a wireless tag by communicating with said wireless tag;

a creating step for creating a control signal adapting to the electronic appliance detected by said first detecting step;

a first transmitting step for repeatedly transmitting a control signal created by said creating step to a processor of said electronic appliance detected by said first detecting step;

a second detecting step for detecting an electronic appliance responding to the control signal transmitted by said first transmitting step; and a displaying step tor displaying am operation screen to remotely control the electronic appliance detected by said second detecting step, wherein in said operation screen, a character corresponding to the electronic appliance in at least one of an on state or a standby state detected by said second detecting step is displayed, and a character corresponding to an electronic appliance in an off state except for the electronic appliance detected by said second detecting step, out of one or more electronic appliances detected by said first detecting step is further displayed in a different manner from that of at least one of the characters corresponding to the electronic appliance detected by said second detecting step.

11. A remote control apparatus according to claim 1, further comprising a sender which sends a request signal to the wireless tag provided on the electronic equipment to request return of the identification signal from the wireless tag, wherein said receiver receives the identification signal returned from the wireless tag in response to the request signal.

12. A remote control apparatus for remotely controlling electronic equipment provided with a wireless tag which transmits an identification signal, comprising:

a receiver which receives the identification signal from the wireless tag provided on the electronic equipment;

a first detector which detects, based on the identification signal received by said receiver, an electronic appliance;

a creator which creates a control signal adapting to the electronic appliance detected by said first detector;

a first transmitter which repeatedly transmits a control signal created by said creator to a processor of said electronic appliance detected by said first detector;

a second detector which detects an electronic appliance responding to the control signal transmitted by said first transmitter;

a display which displays an operation screen to remotely control the electronic appliance detected by said second detector; and a telecommunicator which realizes a telephone call function by executing communication processing with one or more of a plurality of base stations, wherein said first detector executes detecting processing in a case that its own present location is determined at a specific location on the basis of the respective identification information detected by said telecommunicator from one or more of the plurality of base stations, and in said operation screen, a character corresponding to the electronic appliance detected by said second detector is displayed.

13. A remote control apparatus according to claim 12, further comprising:

an information detector which detects the respective identification information of the one or more of the plurality of base stations which are able to be communicated with by said telecommunicator;

a register which registers the respective identification information detected by said information detector at a specific location; and a determiner which determines whether or not a match condition is satisfied between the respective identification information detected by said information detector at an arbitrary location, after completion of registering processing by said register, and identification information having been registered by said register, wherein said first detector executes detecting processing at the location where a determination result by said determiner is affirmative.

14. A remote control apparatus according to claim 13, further comprising a guider which guides registration via said register at the location where a determination result by said determiner is negative.

* * * * *